(12) United States Patent
Ji

(10) Patent No.: US 8,102,592 B2
(45) Date of Patent: Jan. 24, 2012

(54) REFLECTIVE DISPLAY USING CALIBRATION DATA FOR ELECTROSTATICALLY MAINTAINING PARALLEL RELATIONSHIP OF ADJUSTABLE-DEPTH CAVITY COMPONENT

(75) Inventor: Zhong Ji, Seattle, WA (US)

(73) Assignee: Unipel Technologies, LLC, Seattle, WA (US)

( * ) Notice: Subject to any disclaimer, the term of this patent is extended or adjusted under 35 U.S.C. 154(b) by 167 days.

(21) Appl. No.: 12/730,946

(22) Filed: Mar. 24, 2010

(65) Prior Publication Data

US 2011/0235154 A1    Sep. 29, 2011

(51) Int. Cl.
*G02B 26/00* (2006.01)
*G02B 27/00* (2006.01)
*G09G 3/34* (2006.01)
(52) U.S. Cl. ............ 359/295; 359/578; 359/291; 345/85
(58) Field of Classification Search ................ 345/85; 359/260, 290, 292, 293, 295, 578
See application file for complete search history.

(56) References Cited

U.S. PATENT DOCUMENTS

| | | | |
|---|---|---|---|
| 6,774,963 B1 * | 8/2004 | Nakao et al. ................ | 349/104 |
| 2005/0168791 A1 * | 8/2005 | Latypov et al. ............. | 359/239 |
| 2008/0151347 A1 * | 6/2008 | Chui et al. .................. | 359/238 |

FOREIGN PATENT DOCUMENTS

| | | |
|---|---|---|
| WO | WO 2007/053438 | 5/2007 |
| WO | WO 2011/119246 A1 * | 9/2011 |

OTHER PUBLICATIONS

Becker et al., "MEMS spatial light modulators with integrated electronics", MOEMS and Miniaturized Systems III, James H. Smith, Editor; Proceedings of SPIE vol. 4983, 2003, pp. 248-258.

Garmire, Elsa, "Theory of quarter-wave-stack dielectric mirrors used in a thin Fabry-Perot filter", Applied Optics, vol. 42, No. 27, Sep. 20, 2003, pp. 5442-5449.

Medicus et al., "Interferometric measurement of phase change on reflection", Applied Optics, vol. 46, No. 11, Apr. 10, 2007, pp. 2027-2035.

\* cited by examiner

*Primary Examiner* — David N Spector
(74) *Attorney, Agent, or Firm* — Law Offices of Ronald M Anderson

(57) ABSTRACT

Interferometric modulators include a movable mirror that is actuated by voltage applied to a plurality of electrodes relative to at least one other electrode, to define a cavity relative to a partially reflective mirror formed by a top plate. The depth of the cavity determines a bandwidth of light that is modulated by internal reflections within the cavity and which interferes with light that is reflected from a partially reflective mirror on the top plate, producing a desired reflected color of light for the modulator. Variations in manufacturing and material characteristics can cause the movable mirror to tilt relative to the partially reflective mirror, which degrades the modulation accuracy. To compensate, different voltages can be applied to the plurality of electrodes. The voltage can be determined at time of manufacture and stored in non-volatile memory, for use when the modulator is actuated during use.

42 Claims, 20 Drawing Sheets

REFLECTIVE DISPLAY USING CALIBRATION DATA FOR ELECTROSTATICALLY MAINTAINING PARALLEL RELATIONSHIP OF ADJUSTABLE-DEPTH CAVITY COMPONENT

BACKGROUND

Reflective display panels for portable applications have significant advantages over light emissive and transmissive devices. They are lighter, smaller, more power efficient, less irritating to the human eye, and function best under bright light—in comparison to light emissive or transmissive displays, which tend to be obscured by bright ambient lighting, such as direct sunlight. In recent years, extensive effort has been put into the development of reflective display technologies.

The most common technique seen in the market today centers around the electrophoretic effect, which operates on the principle that electrically charged particles will migrate away from surfaces charged to the same polarity as themselves and towards surfaces charged to an opposite polarity. Display devices which use this effect are known as electrophoretic image displays (EPIDs). Many patents, including U.S. Pat. Nos. 4,655,897; 4,732,830; 4,742,345; 4,746,917; 4,772,820; 5,360,689; and 7,259,744, describe and illustrate methods, and techniques for making EPIDs and the apparatus comprising them. While the low power consumption rate of EPIDs is a clear advantage, these displays exhibit extremely slow response times, making them unsuitable for video displays. Furthermore, the high cost of manufacturing color EPIDs presents another significant barrier to their widespread use for displays.

Other techniques are used in electrowetting displays and cholesteric liquid crystal displays, which are respectively described and illustrated in U.S. Pat. No. 6,911,132 (Pamula et al.), and U.S. Pat. No. 5,570,216 (Lu et al.). Electrowetting technology relies upon adjusting an electric field to modify the wetting properties of a hydrophobic surface. This method is effective in creating high-brightness, high-contrast screens. The quick rate at which the voltage can be switched in an electrowetting display partly overcomes the problem of slow response rate in electrophoresis devices.

The bistable cholesteric liquid crystal display mechanism takes advantage of light diffraction. Like electrophoresis screens, however, cholesteric LCD screens also respond too slowly to be suitable for video displays.

For use in reflective display technologies, techniques relying on light interference may be superior to the techniques described above, because of the relative simplicity of such devices. Electrophoretic image displays, electrowetting technology, and cholesteric LCDs each rely on the unique characteristics of specific materials, which tends to add to their manufacturing costs, since such materials are not readily available. Also, the display screens for such devices require interlaced sub-pixels, and consequently, have more difficulty in achieving a full color display. By comparison, optical interference display modules rely only on the mechanical properties of materials and are therefore the most promising of developing display techniques.

U.S. Pat. No. 5,835,255 (Miles) and subsequent patents disclose how light in the visible spectrum can be controlled with an array of modulation elements to make a display panel. As shown in FIGS. 1A and 1B (Prior Art), each modulator 100 contains two parallel reflective mirrors 102 and 104, which are separated by a cavity 101 and a transparent film 105. Standoffs 108 support mirrors 102 and 104 so that they are spaced apart from each other, defining cavity 101. Electrodes are provided on each of the mirrors. Mirror 102, which is the first of the two mirrors to interact with incident light, partially reflects the incident light, but transmits the remainder of the incident light. Mirror 104 then reflects the light that has passed through mirror 102. When a voltage is applied to the electrodes on each mirror, mirror 104 is drawn toward mirror 102, collapsing the cavity, and switching the modulator from its natural "ON" state (as shown in FIG. 1A) to an "OFF" state (shown in FIG. 1B). Switching to the OFF state effectively eliminates cavity 101, so that mirror 104 is collapsed onto transparent film 105, which is an electrical insulator. Transparent film 105 thus prevents electrical current from flowing between the two mirrors and determines the spacing between the two mirrors in the OFF state. The optical property of modulator 100 in its OFF state depends on the thickness of the transparent film. Adjusting the spacing between the two mirrors in the ON state of the modulator can alter the phase of the light components, to change between constructive and destructive interference. Therefore, switching modulator 100 from ON to OFF changes the pixel from a primary color (where the specific color depends on the spacing between mirrors 102 and 104), to black. In one embodiment, provision of a color display using this technique requires at least three sub-pixels, each sub-pixel representing a different one of the three primary colors for a color pixel. When the voltage is removed from the electrodes on mirrors 102 and 104, modulator 100 should reliably switch from the ON state to the OFF state. This requirement can present a challenge to the manufacturing process due to the tendency of contact parts in micro structures to exhibit static friction, which is referred to as "stiction." Anti-stiction bumps are usually used to improve the reliability of the release operation between contacting parts in such structures. Some designs in the prior art use tethers that cause mirror 104 to twist to release the tensile, or compressive tension, and also to help to reduce stiction between the mirror and the transparent film.

Three plate structures have also been proposed in the prior art to achieve multistate color modulation (as disclosed in U.S. Pat. No. 7,372,613). In this design, an additional plate with electrodes is attached to the structure. The movable plate is therefore tri-stable and can toggle between three states.

Considerations have to be given to the balance between the elastic force for releasing the mirror from the stiction forces, and the driving voltage. On one hand, the elastic restoring force is helpful to reduce stiction. But to drive the movable mirror, an undesirably high electrostatic force is required (i.e., higher voltage). It is difficult to find the appropriate balance, especially when the requirements of restoring and driving force for different colors are different.

Despite any advantages, the aforementioned techniques all share a common problem—a requirement for extremely precise structures that are both complex and costly to fabricate. The techniques all use spatial dithering to maximize a display screen's resolution and color depth. Spatial dithering requires that every pixel unit include a minimum of three sub-pixel modulators disposed side-by-side, and each modulator for the three or more sub-pixel colors must be manufactured differently by applying distinctive steps. Activation of every sub-pixel must also be controlled through row and column lines. Precision is crucially important because the sub-pixels are small and the external electrical connection structure must be complex. It should be evident that such precision is difficult and costly to achieve.

U.S. Pat. No. 7,006,272 discloses a method that attempts to avoid this problem by modulating a light beam so as to realize color changeable pixels. The principle of color modulation is similar to that disclosed in U.S. Pat. No. 5,835,255, but the method instead uses a three-parallel-plate structure (see prior art FIGS. 2A-2C). A bottom plate 202 and a middle plate 204 are both reflective and form a cavity. Middle plate 204, however, is deformable and its vertical position is controllable by applying a voltage to either plate 202 or a top plate 206. Adjusting the voltage moves middle plate 204 by a desired extent, thereby altering the frequency of the reflected light produced by constructive interference. However, this patent discloses no specific mechanisms that achieve a low curvature of the middle plate when actuated with the applied voltage. Theoretically, middle plate 204, if it is uniform in thickness, would deflect in response to the applied voltage to form a hyperbolic surface, as shown in FIG. 2C, unless the plate deforms sufficiently to touch bottom plate 202 (and flattening like mirror 104 does when it contacts transparent film 105, as shown in FIG. 1B). Therefore, a specific patterned or non-uniform middle plate configuration is required to structurally keep the plate flat. The use of such free moving plates has been attempted, but has not yet been shown to be successful.

To ensure that middle plate 204 moves freely, while retaining a flat shape, four tethers (or at least three) have been used in the prior art, with a tether being disposed at each of the corners of the moving middle plate, to control the deformation of the middle plate and keep the middle plate flat when the voltage is applied to move the plate (e.g., see the disclosure of U.S. Pat. No. 5,999,303). Beam structures have also been used in prior art tunable mirror applications (see for example, the disclosure of U.S. Pat. No. 5,312,513). The structure of the plate and tethers/beams are deposited on a sacrificial layer through sputtering and then patterned using conventional lithography techniques. The sacrificial layer is then etched away, leaving the structure suspended by supporting posts. Upon release, tethers and beams typically experience deformation due to residual stress, which causes the tethers/beams to shrink or expand. In addition, due to uncontrollable manufacturing deviations, the tethers/beams may not be consistent from one fabricated device to the next. These variations can cause poor color realization or malfunction. A few faulty pixels in a display panel can result in the entire panel being discarded—which can substantially increase fabrication costs.

Display products conventionally use red, green, and blue (RGB) to form color pixels. Different proportional combinations of red, green, and blue components can be used to produce the full spectrum of colors. Printers, on the other hand, generally use a subtractive color mixing method to produce colors. In particular, varying amounts of cyan, magenta, yellow, and black (CMYK) inks are applied to a sheet of white paper in layers. Each layer subtracts some of the light that would otherwise be reflected from the white background, and various combinations of the layers can provide a particular color. By using different proportional amounts of the tinted inks in the layers, almost any visible colors in the full spectrum of colors can be produced. Thus, for printed images, colors are produced on a page by subtracting selected proportions of different wavelengths of light from the light that would be reflected from a white background.

It is also conventional to use RGB primary colors to produce the variety of colors created on emissive or transmissive display devices. It appears to be practical and economical to do so, since single-bandwidth light is more convenient to obtain through either light emission or color filters. Moreover, black and white can be realized on a black background in an RGB display, without adding an extra (i.e., a fourth) color dimension.

But color conversion from RGB used for display products to CMYK that is generally used for printers decreases color fidelity. U.S. Pat. No. 7,586,472 (Marcu et al.) teaches a display using a color subtractive method to address the problem of achieving a full color display, for light transmissive devices.

In practice, the significant number of pixels on a display panel required to achieve a desired resolution makes the panel difficult to manufacture. Any malfunctioning pixels compromise the quality of the overall panel, so that a panel with more than a few defective pixels is not usable. Too many defective panels result in an unacceptable low production yield that increases fabrication costs. Thus, it remains difficult to produce display panels of a consistent quality at reasonable cost level.

Thus, there is clearly a need for a color display panel that uses a reflective light modulation array, and which is not only readily implementable, but also fast in response, low in power consumption, low in cost, and easy to make. It is preferable to provide colors that are modulated in CMYK using the subtractive method even though RGB additive method has conventionally been adopted in other types of panel displays. The requirement for fabrication precision when producing complex structures should be transferred from the process used to manufacture the display panel to driver electronics that are external to the panel, to improve production yield and lower the cost.

SUMMARY

In consideration of the preceding discussion, an exemplary interferometric modulator has been developed that has a movable plate actuated to define a cavity. The movable plate is automatically controlled to compensate for imbalance conditions that can otherwise cause the movable plate to tilt about at least one of two orthogonal axes. The interferometric modulator further includes a fixed plate that is disposed opposite the movable plate. A distance between the movable plate and the fixed plate defines a depth of the cavity, which is used to modulate light transmitted into the cavity. A plurality of electrodes are disposed opposite at least one other electrode. Either the plurality of electrodes or the at least one other electrode is disposed on the movable plate. Conductors are coupled to the plurality of electrodes and to the at least one other electrode and are configured to be coupled to a controlled voltage source, to enable predefined voltages to be applied to each of the electrodes of the plurality of electrodes. Application of an appropriate voltage to each electrode produces an electrostatic attraction that moves the movable plate so as to change the depth of the cavity and also compensates for the imbalance conditions to substantially eliminate tilting of the movable plate about at least one of the two orthogonal axes.

In some exemplary embodiments, the plurality of electrodes includes three electrodes that are disposed side-by-side and are parallel to a plane of the fixed plate, but are asymmetrically disposed relative to one of the axes. The three electrodes electrostatically control the cavity depth and tilting of the movable plate about the two orthogonal axes.

In still other exemplary embodiments, the plurality of electrodes includes two electrodes that are disposed side-by-side each other, along a first axis that is parallel to a plane of the fixed plate. Two supplemental electrodes are also disposed side-by-side each other, along a second axis that is parallel to the plane of the fixed plate, generally orthogonal to the first axis, and substantially parallel to one of the orthogonal axes. The supplemental electrodes are on a different surface than the plurality of electrodes and the at least one other electrode and are coupled to the conductors to enable appropriate predefined voltages to be applied to each of the supplemental electrodes. These supplemental electrodes electrostatically control tilting of the movable plate about the other of the orthogonal axes, which is substantially parallel to the first axis.

The fixed plate includes a partially reflective coating that transmits a part of the light that is incident on the fixed plate, into the cavity, and reflects a remainder of the light that is incident. The movable plate also includes a partially reflective coating that reflects the light transmitted into the cavity. The depth of the cavity determines a waveband of light modulated in the cavity that is then transmitted through the partially reflective coating on the fixed plate. This light that is modulated and transmitted from the cavity interferes with the part of the light that is reflected by the partially reflective coating on the fixed plate to produce reflected light of a desired color.

The reflective coating on the movable plate comprises either an electrically conductive material or is a dielectric that is coated with an electrically conductive film. An electrically insulator coating is applied between the fixed and the movable plates to electrically insulate the movable plate from the fixed plate, in at least some exemplary embodiments. The movable plate can then be in contact with the fixed plate when the movable plate is not actuated by the voltage applied to the plurality of electrodes.

At least one spring beam supports the movable plate in suspension when the movable plate is actuated by the voltage that is applied to the plurality of electrodes to cause the movable plate to move relative to the fixed plate, to define the cavity between the movable plate and the fixed plate. In some exemplary embodiments, the at least one spring beam comprises a single spring beam configured to have an elastic restoring force compatible with a rigidity of the movable plate, so that the single spring beam provides sufficient restoring force to restore the movable plate to an un-activated position when the voltage is removed from plurality of electrodes, but not so great as to cause a distortion of the movable plate when the movable plate is actuated by the voltage applied to the plurality of electrodes. In other exemplary embodiments, the at least one spring beam comprises two spring beams disposed along opposite edges of the movable plate. In still other exemplary embodiments, the at least one spring beam comprises a spring beam disposed along each different edge of the movable plate.

In some exemplary embodiments, a bottom plate is disposed adjacent a side of the movable plate that is opposite where the fixed plate is disposed. The bottom plate also is fixed and includes either the plurality of electrodes, or the at least one electrode.

Another aspect of this technology is directed to a method for controlling a movable plate of an interferometric modulator to compensate for imbalance conditions that can otherwise cause the movable plate to tilt and not be substantially parallel to a top fixed plate. In the interferometric modulator, a distance between the movable plate and the top fixed plate defines a depth of a modulation cavity in which light is modulated. The method includes steps that are generally consistent with the functions of the components discussed above.

Any of the interferometric modulators and the method discussed above can be applied to a display panel that includes a plurality of such interferometric modulators arranged in rows and columns. Application of the appropriate voltages to the electrodes of each interferometric modulator in the display panel causes it to reflect the desired color and compensates for any tilting of the movable plate in the interferometric modulator, relative to the fixed plate. Interferometric modulators with similar voltage characteristics to produce a desired color of reflected light and to compensate for tilting of the movable plate can be grouped together into groups and an indication of the appropriate voltages for each such group can be stored in non-volatile memory for use in actuating the interferometric modulators in the display panel to produce still images or video images.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIGS. 1A and 1B (Prior Art) are side elevational views of a modulator with two parallel reflective mirrors, including a movable lower mirror, and a fixed partially reflective upper mirror, showing the mirror in an "ON" state in FIG. 1A and in an "OFF" state in FIG. 1B;

FIGS. 2A, 2B, and 2C (Prior Art) are side elevational views of modulator having three parallel plates, including an upper transparent plate with an electrode and a lower reflective plate with an electrode, the middle plate being reflective and being moved in response to voltages applied to either the top plate (FIG. 2B) or the bottom plate, causing movement (and possible deformation) of the middle plate (FIG. 2C);

Figure 6A:
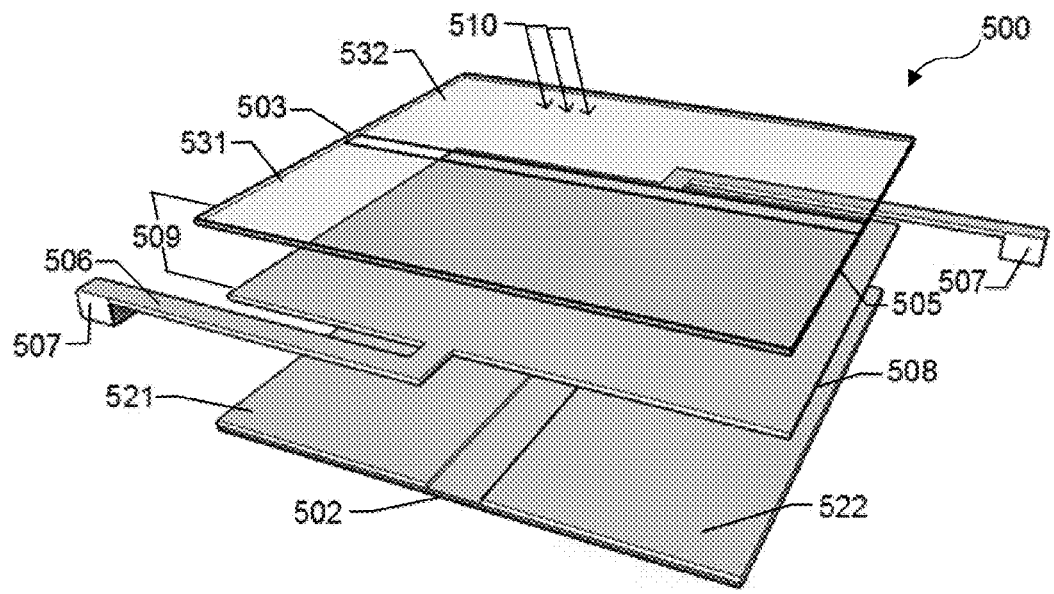
FIG. 6A illustrates an exemplary FPI modulator using passive matrix addressing and a movable mirror that is suspended by two spring beams, in which voltage differentials applied to a plurality of electrodes again compensate for tilting of the movable mirror relative to the fixed mirror.
Figure 6B:
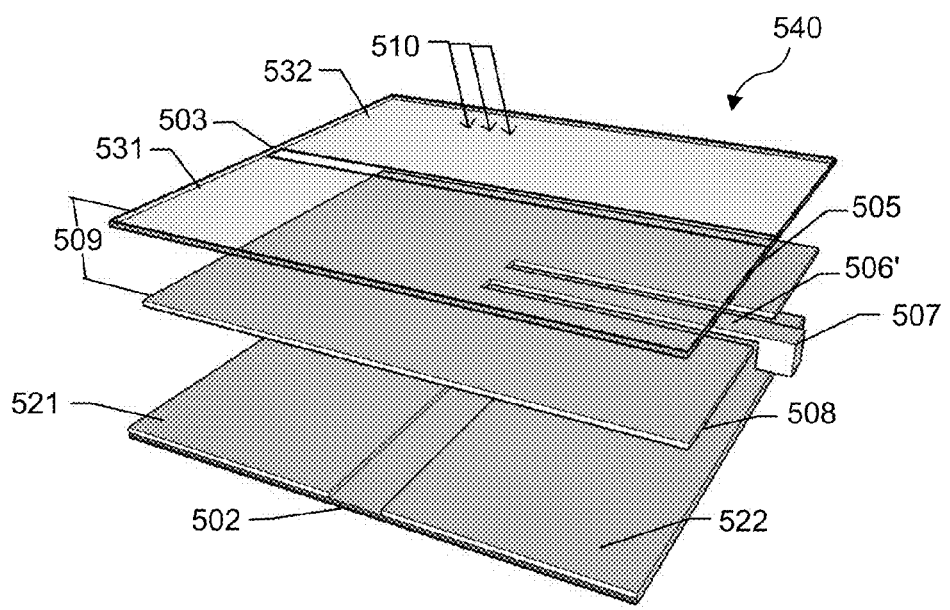
FIG. 6B illustrates an exemplary FPI modulator that employs a single supporting beam to suspend the movable mirror, wherein the supporting beam is simply patterned on the same layer as the movable mirror, and the polarity and voltages applied to the electrodes provides forces to compensate for any tilting, while driving the movable mirror to achieve a desired cavity depth.
Figure 6C:
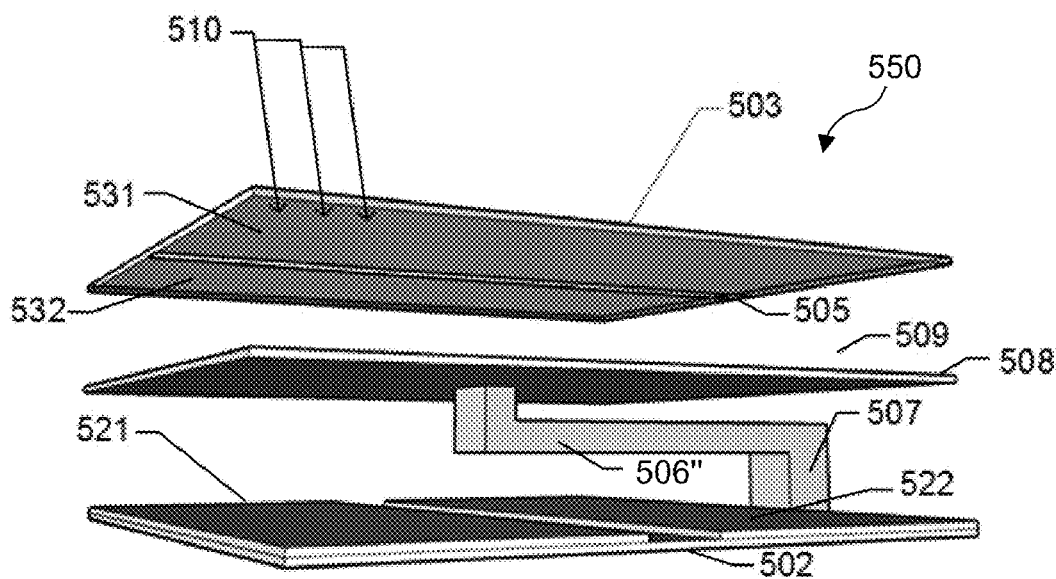
Figure 6D:
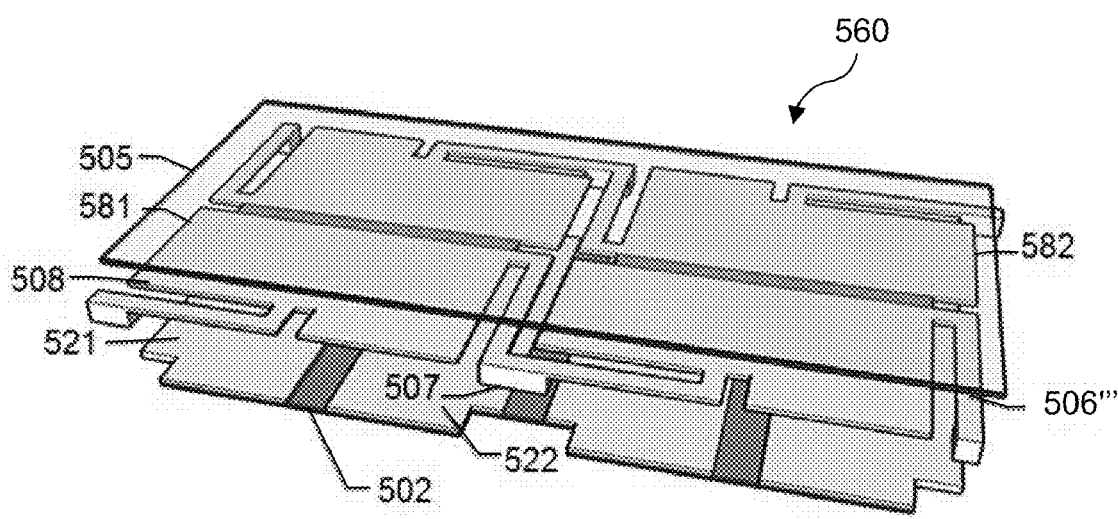
Figure 7A:
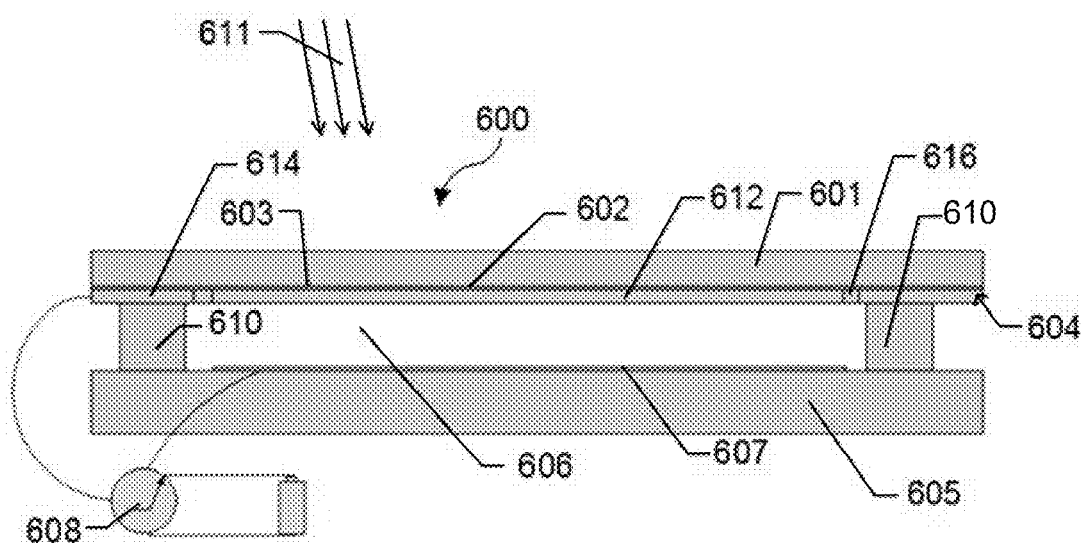
Figure 7B:
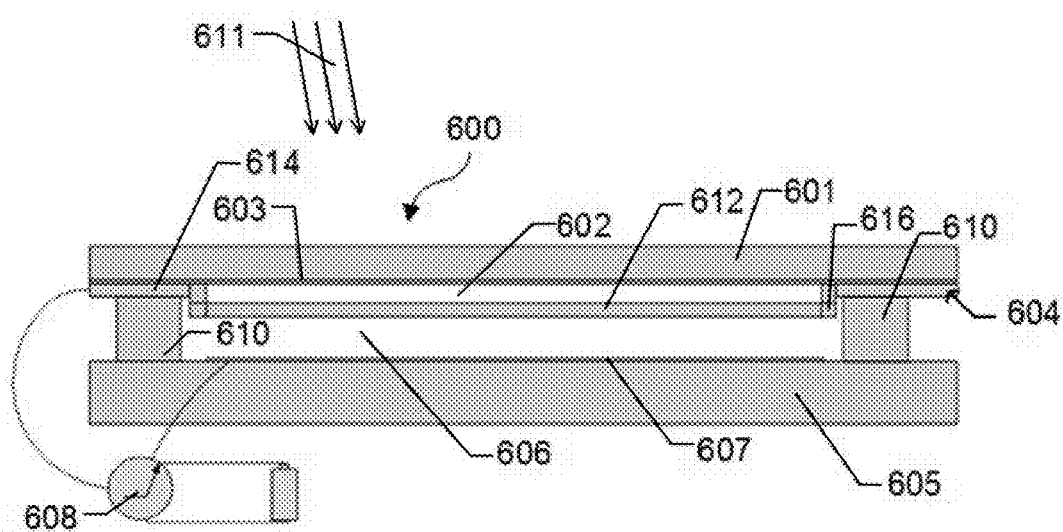
Figure 8:
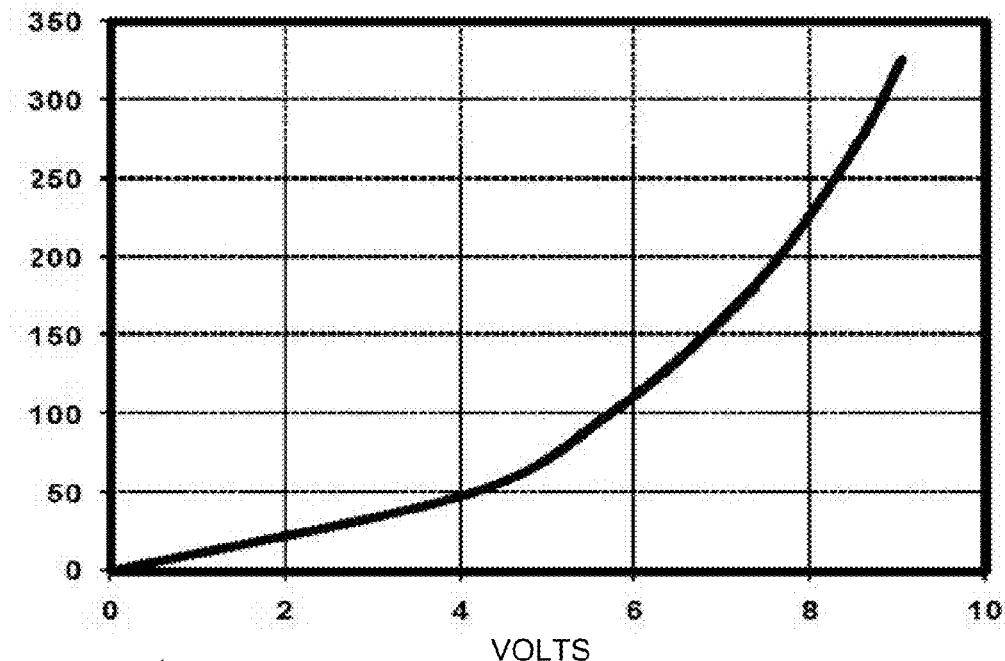
Figure 13A:
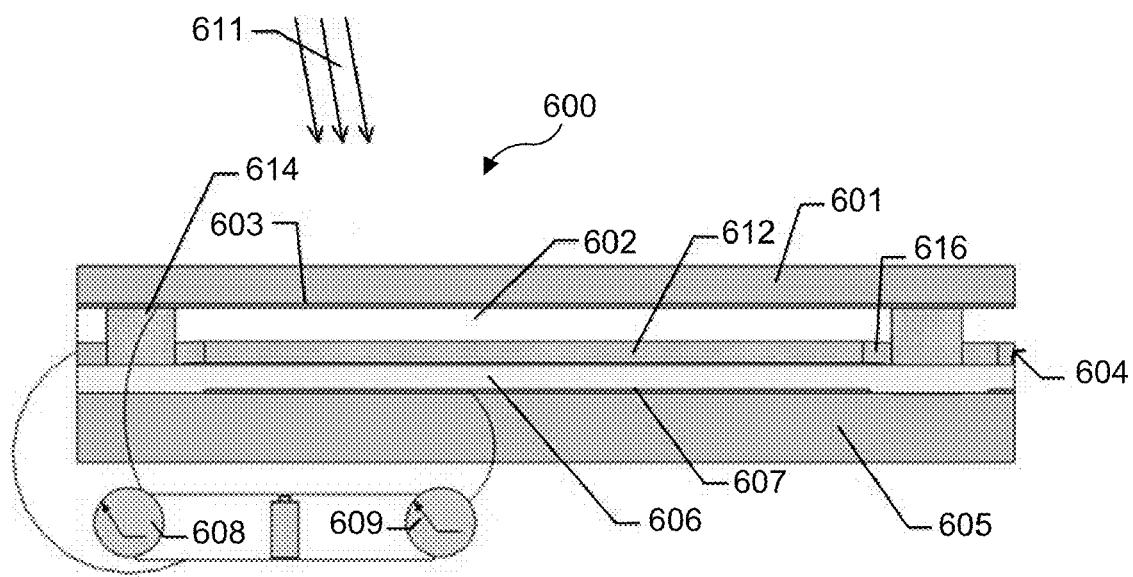
Figure 13B:
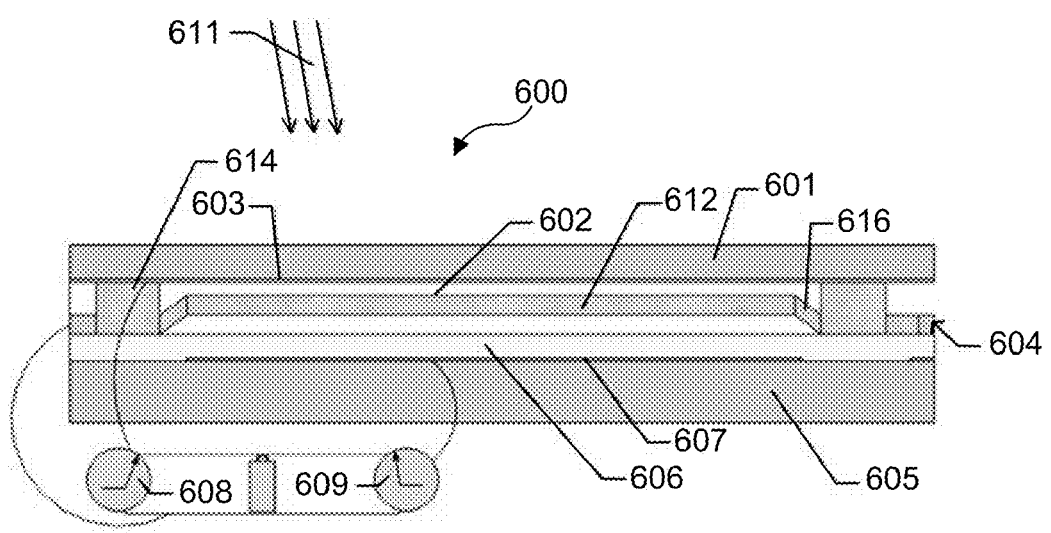
Figure 14:
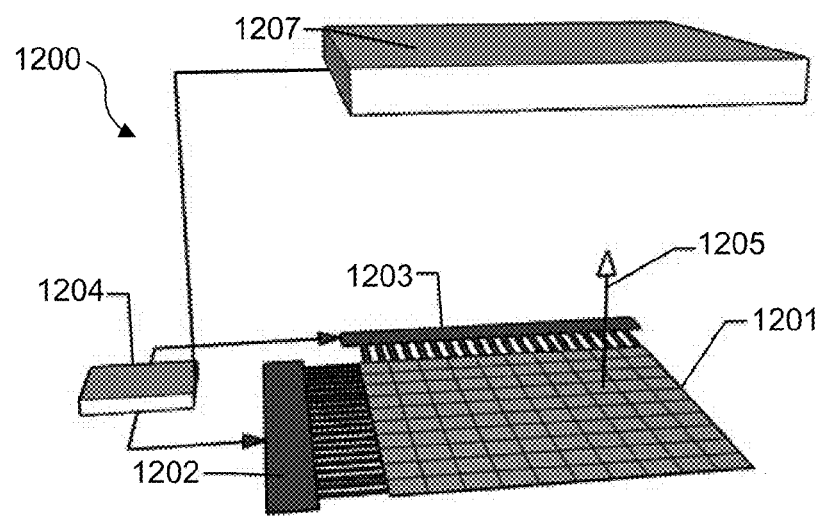
Figure 15:
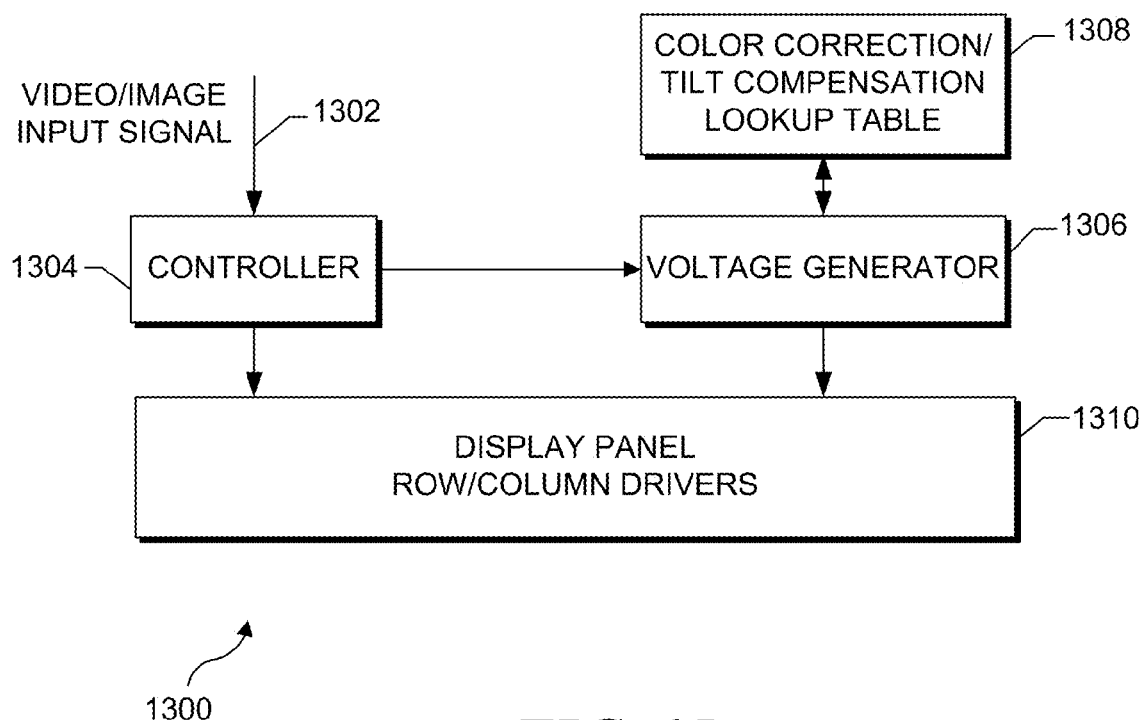

FIG. 6C also illustrates an exemplary FPI modulator that has a single supporting beam, but in this embodiment, the supporting beam is configured to provide an elastic restoring force that is compatible with the rigidity of the movable plate, so that the plate is not deformed with the applied voltage moves the plate;

FIG. 6D illustrates another exemplary FPI modulator that includes four supporting beams to suspend the movable plate, with one pair of electrodes on the bottom plate and another pair (orthogonal to the first pair) on the movable plate, to enable both actuating the movable plate and compensation to prevent tilting;

FIGS. 7A and 7B illustrate an exemplary embodiment of a reflective FPI based modulator that includes three plates without spacers, the movable plate being disposed against the underside of the top plate when the modulator is not actuated (FIG. 7A) and is pulled away to define a cavity when actuated (FIG. 7B) and differential voltages applied to a plurality of electrodes patterned on the plates compensate for thermal expansion, residual stress, and other manufacturing imperfections;

FIG. 8 is an exemplary graph illustrating the voltage-displacement relationship of the movable plate in the embodiments of FIGS. 6A-6D;

FIGS. 9A-9D illustrate sequential steps for manufacturing a design for exemplary FPI modulators used on a display panel, in accord with the present approach, using conventional MEMS lithography processes, where for simplicity, only four pixel units (i.e., four sets of movable/fixed plates, and two rows and two columns of electrodes) are illustrated;

FIGS. 10A-10F illustrate sequential steps for manufacturing a design used in another configuration for exemplary FPI modulators for a display panel, again showing only four pixel units of the panel to simplify the illustrations;

FIGS. 11A-11F illustrate the sequential steps for manufacturing the modulators used for a display panel where a single spring beam is used for actuation, and again showing only four pixel units of the display;

FIGS. 12A-12G illustrate the sequential steps for producing an exemplary embodiment on a transparent media, showing only four pixel units of the display panel that used this embodiment;

FIGS. 13A and 13B illustrates how an exemplary FPI modulator is operated to resonate with a desirable visible light, where the modulator is shown in an un-driven state (FIG. 13A) and in a driven state (FIG. 13B);

FIG. 14 is a schematic illustration of a display panel calibration setup, used to determine the voltage and compensation differentials that should be applied to reflect each of a plurality of different colors at each pixel, when the display panel is illuminated with full spectrum white light; and FIG. 15 is a schematic block diagram illustrating an exemplary system that uses the corrections for color and tilt for different groups of modulators, to control the row and column electrodes in the FPI modulators constructed in accord with various exemplary embodiments of the present approach so as to produce desired colors and compensate from any tilt or deviation of the movable mirror from a parallel relationship with a fixed mirror arising from variations in materials and manufacturing variations.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Color Realization

Figure 1A:
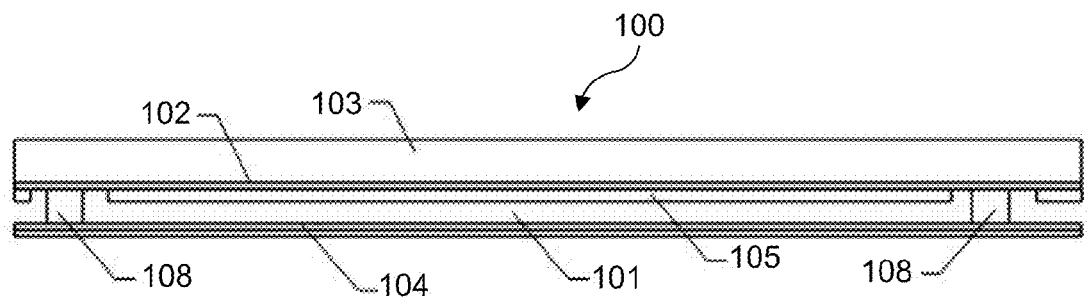
Figure 1B:
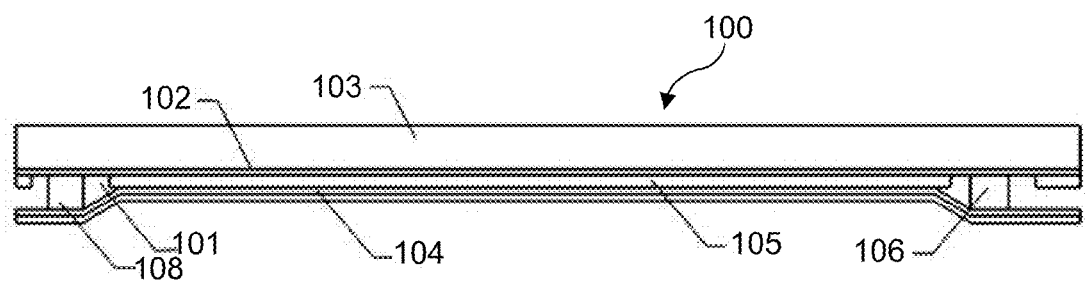
Figure 2A:
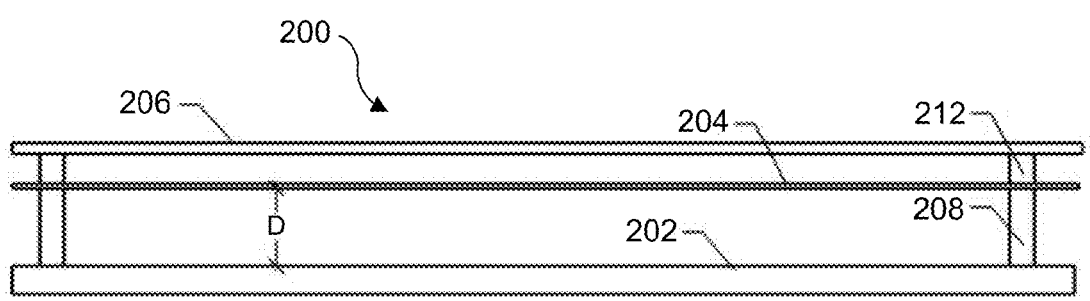
Figure 2B:
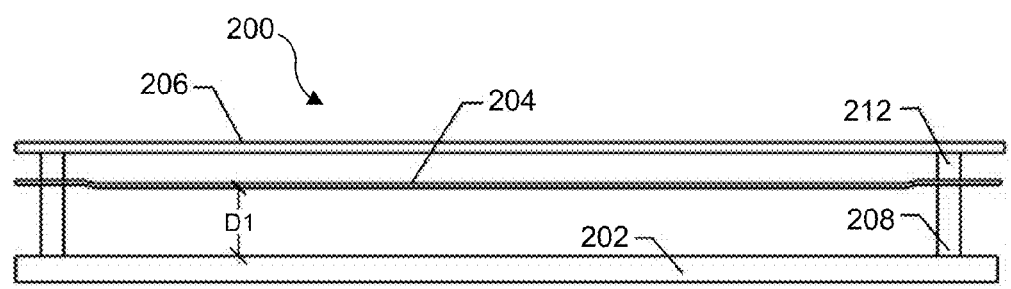
Figure 2C:
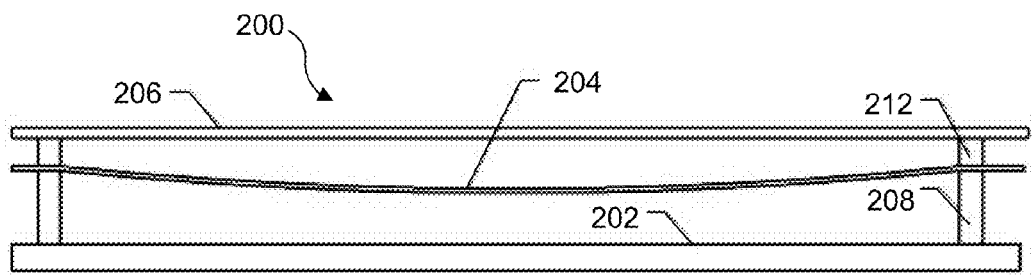
Figure 3:
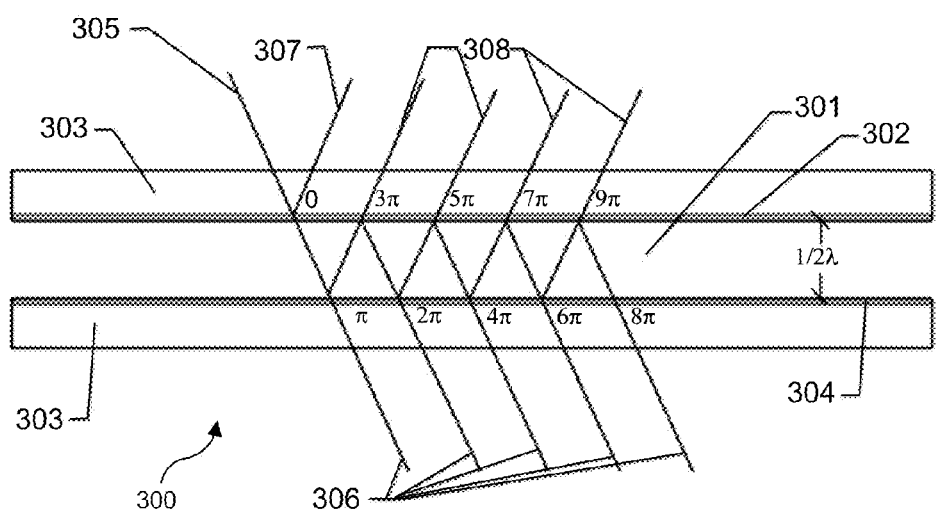
FIG. 3 illustrates a Fabry-Perot interferometer (FPI) having two parallel mirrors separated by a cavity or a transparent etalon, wherein the first mirror comprises a dielectric stack rather that a thin metallic coating, which avoids phase inversion of the reflected light.

Optical interference modulators for a display device are essentially micro Fabry-Perot optical resonators. As shown in FIG. 3, an exemplary embodiment of a Fabry-Perot interferometer (FPI) 300 includes two parallel mirrors, including a top mirror 302 and a bottom mirror 304 that are separated by a cavity (or a transparent etalon) 301. Light beam 305 enters the FPI from the incident side, i.e., from above, travels through top mirror 302, experiences multiple reflections between the two mirrors, and successively exits as rays 306, 308 from top mirror 302 and bottom mirror 304, respectively. Depending on the thickness of the cavity or etalon, the light exiting the FPI will have experienced either constructive or destructive interference. Controlling the depth of the cavity (i.e., the distance between top mirror 302 and bottom mirror 304) changes the state of the modulator. Each state corresponds to a different reflective color. It is also possible for a multiple state modulator to mix colors by temporal dithering at a rate sufficiently fast so that the human eye does not perceive each different color produced at a time. By controlling the fraction of time for each color output to be a very short time frame, the pixel can be adjusted to produce a wide range of visible colors.

For FPI modulator 300 with two mirrors separated by a cavity, as shown in FIG. 3, the refractive index of cavity 301 is always less than that of mirror-coated media 303. A primary reflected ray 307 from top mirror 302 therefore experiences no phase inversion if the mirror is a dielectric stack and not a metallic film or coating, since a metal coating exhibits a different phase angle than light reflected by a dielectric. Light transmitted through top mirror 302 travels through cavity 301, maintaining its phase as it propagates, is incident on bottom mirror 304, and splits into a transmitted component 306 and a reflected component. The reflected light component experiences a phase inversion upon its reflection from bottom mirror 304, travels back through cavity 301, and joins a primary reflected beam 307. Primary reflected beam 307 and secondary reflected beams 308 are opposite in phase angle when their wavelength is equal to twice the cavity depth. In addition, all successive reflected beams 308 are out of phase with primary reflected beam 307. Therefore, light of a specific wavelength experiences full destructive interference on the reflective side when the round trip through the cavity is equal to an integer multiple of that wavelength. On the transmission side, however, the light beams of the same wavelength comprising transmitted components 306 experience fully constructive interference. As a result, parallel top and bottom mirrors 302 and 304, and cavity 301 act as an optical filter, which transmits light of a specific wavelength through the device, but reflects light of other wavelengths.

Figure 4:
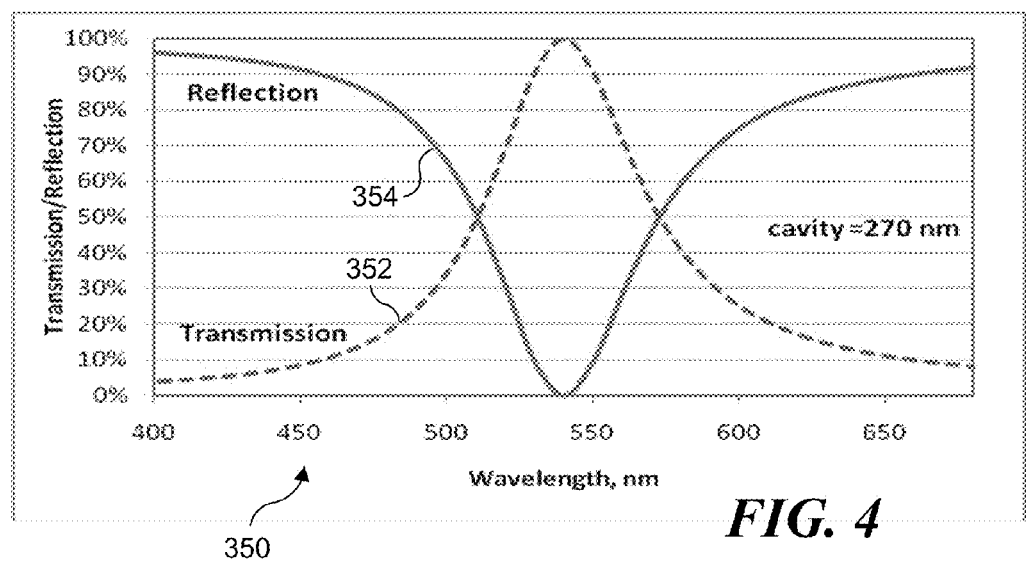
FIG. 4 is a graph of percent transmission/reflection vs. wavelength for an FPI having a cavity depth of 270 nanometers.

The theory has been developed mathematically using the Airy Function. For incident light that is normal to an FPI, the transmission T and reflectance R of the FPI can be calculated with Eq. (1) and (2), as follows.

$$R = \frac{\left(\sqrt{R_1} - \sqrt{R_2}\,V\right)^2 + 4\sqrt{R_1 R_2}\,V\sin^2\left(\frac{2\pi L}{n\lambda}\right)}{\left(1 - \sqrt{R_1 R_2}\,V\right)^2 + 4\sqrt{R_1 R_2}\,V\sin^2\left(\frac{2\pi L}{n\lambda}\right)} \quad (1)$$

$$T = \frac{(1-R_1)(1-R_2)V}{\left(1 - \sqrt{R_1 R_2}\,V\right)^2 + 4\sqrt{R_1 R_2}\,V\sin^2\left(\frac{2\pi L}{n\lambda}\right)} \quad (2)$$

where $R_1$, $R_2$ are the reflective coefficients of intensity at the two mirrors, L is the cavity depth (i.e., the distance between the mirrors), $\lambda$ is the wavelength, and n and V are the refractive index and loss index of the media between the mirrors, respectively. When the cavity media is air (i.e., V=1), no loss is assumed. When $R_1$ and $R_2$ are equal, the resonant wavelength reaches its peak. In general, the higher $R_1$ and $R_2$ are, the narrower the transmission bandwidth is. FIG. 4 shows a set of transmission and reflective functions 352 and 354, respectively, for a cavity depth of 270 nanometers, where $R_1=R_2=70\%$.

As shown in a graph 350 in FIG. 4, such an FPI only allows light with a wavelength equal or close to integer multiples of twice the cavity depth to pass through (i.e., in this example, light with a wavelength of 540 nanometers) and reflects the rest of the light spectrum. The bandwidth of the light transmitted through the device depends on the value of $R_1$ and $R_2$. In the absence of absorption, the reflectivity is the complement of the transmission, such that T+R=1. More specifically, an FPI reflects and inverts the phase of light with a wavelength about that of the transmitted color.

For example, if the cavity depth equals half of the wavelength of red light (i.e., 325 nanometers), an FPI will reflect light with a cyan color and transmit light of a red color. Similarly, when the cavity depth equals 275 nanometers, an FPI will reflect light of a magenta color and transmit light of a green color. When the cavity depth equals 225 nanometers, an FPI will reflect light of a yellow color and transmit light of a blue color. When the cavity depth is less 200 nanometers, the visible light from the front and back mirrors has negligible propagating phase delay through the cavity. Since the light from the back mirror inverts its phase, most of the visible light destructively interferes resulting in no reflected visible light, so that the display appears black.

The above discussion demonstrates that, if a dielectric mirror surface is used, an FPI display device does not reflect light having a single bandwidth or color, when full spectrum visible light is incident on the display, and is thus not an RGB display. The color reflected from such an FPI should be a combination of spectrum that complements the additive primary color transmitted through the FPI. In other words, the FPI reflects subtractive primary colors in a manner similar to color ink printed on a white sheet of paper. Therefore, if the coating materials or layers of the mirrors are carefully selected, the display will exhibit subtractive primary colors.

For a given cavity, the spectrum of reflection is subject to the reflectivity or the finesse of the two mirrors that determines the selectivity of the filter. If the optical loss is negligible, the finesse of the mirrors in the FPI is defined as:

$$F = \frac{4\sqrt{R_1 R_2}}{\left(1 - \sqrt{R_1 R_2}\right)^2} \quad (3)$$

For a given cavity, the filtered bandwidth gets narrower as the reflectivity of the two mirrors approaches unity. Therefore, the bandwidth of the transmitted and reflected light can be adjusted by changing the reflectivity of the two mirrors.

Dielectric mirrors commonly comprise a stack of quarter wavelength transparent films, with the refraction index alternating from high to low. Incident light reflected from the interfaces of layers interferes constructively. For the top mirror of an FPI, the decision of whether to use a mirror that is a metallic film or dielectric stack layer has important consequences, since the optical behavior of the FPI completely relies on the properties of the top mirror. If the top mirror is a metallic (and not a dielectric stack) mirror, the light reflected from the top mirror experiences a phase inversion. Also, in that case, the reflected light from the two mirrors interferes constructively. It may thus be preferable to use CMYK as the primary colors for Fabry-Perot Interferometric (FPI) reflective display devices that employ a dielectric top mirror.

Therefore, CMY can be the primary colors for an FPI based reflective display if the top mirrors for the FPI modulator comprises a coating of dielectric material or layers of films. Complex colors are then realized either through spatial or temporal dithering, using a color subtraction scheme. In spatial dithering, a plurality of sub-pixel modulators is used for each pixel in the display, and each sub-pixel modulator at a pixel position is configured to reflect a different one of the subtractive colors, so that because of their proximity to each other, the human eye sees the combination of colors. Each subpixel toggles between black and its designated color. Time dithering uses a single FPI modulator for each pixel, but rapidly sequences through the CMYK colors as necessary to produce four colors in sequence sufficiently fast so that the human eye combines the reflected light to see a desired color that is a combination of the four CMYK colors. Of course, it can also be demonstrated that the primary color is additive in RGB if the top mirror is simply a thin reflective metal film layer (i.e., not a dielectric stack mirror).

Analog Color Control

In 3-dimensional space, the position and orientation of a rigid body is defined with six degrees of freedom, including three coordinates to define the position relative to three orthogonal axes, and three rotational degrees of freedom about the axes. An interferometric modulator contains two parallel reflective mirrors separated by an adjustable-depth cavity. The position of one of the mirrors relative to the other mirror, i.e., the spacing between the mirrors that determines the depth of the cavity, is typically adjusted to change the color of the light reflected by the device. Control of the color of the light reflected by interferometric modulators has exclusively focused on varying one degree of freedom (DOF) in the direction perpendicular to the mirrors. The other five degrees of freedom are typically constrained using mechanical means. The movable mirror is thus retained either in its undriven position, or collapsed against the other mirror or another fixed plate. Up to three states can be realized with such setups. Because of the full contact between mirrors (and other plates), the operation is very much subject to stiction problems.

With the available DOF in which the movable mirror can move in mind, the present novel approach seeks to eliminate stiction problems commonly encountered in MEMS structures used for FPI color modulators. This approach keeps the movable mirror in suspension during the operation of the device, effectively removing contact conditions when the modulator is actuated by applying a voltage to move the movable mirror.

By removing surface contact conditions that cause stiction, another advantage also becomes apparent. Different colors can be realized by keeping the movable mirror in suspension while moving the mirror appropriately to adjust the cavity depth of the FPI modulator, and thereby reflect a desired color of light. Thus, all of the primary colors can be selectively reflected (one at a time) using a single modulator structure. Effectively, the task of color realization at each pixel in a display is converted to controlling the distance between the two mirrors of the FPI modulator disposed at the pixel. As a result, reflective color realization becomes simply an analog voltage control exercise for controlling the position of electrostatic force-actuated mirror plates. As mentioned above, the subtractive CYMK color scheme is preferably used for color dithering, although the RGB color scheme is a practical alternative.

In order to achieve color accurately for the full spectrum of visible light using an FPI modulator, the movable mirror has to be disposed at a desirable position that is parallel to the fixed mirror at all times. As noted above, there are six DOF for a movable mirror, including three rotational DOF and three axial positions. Fortunately, a slight rotation along the axis that is perpendicular to the mirror surface and horizontal movement along the two axes that are parallel to the mirrors does not cause problems in achieving a desired reflected color with the modulator. Therefore, as a practical matter, the movable mirror only requires control of three DOF. The motion in the direction perpendicular to the mirror surface is allowed and the rotational movements along the two axes in the plane that is parallel to the mirrors should be avoided for an interferometric modulator to function properly. In practice, any geometric, mechanical, and structural variations in the tethers or beams can cause undesirable deviation in the two rotational DOF. Without proper control, the movable mirror will tilt undesirably, causing color impurity or operational failure of the modulator.

Controlling the two undesirable rotational DOF is almost impossible using current MEMS technologies, in which movable mirror position is varied while the mirror is in suspension. Achieving this objective requires strict control of the size, the material, the residual stress, and the manufacture precision applied in fabricating the mirror and its supporting arms—at nanometer scale. The allowable error is extremely low, implying that excessive cost in fabricating the device will arise to meet these requirements, if it is even possible to do so.

New Approach for Suspending the Movable Mirror Relative to Fixed Mirror

A completely new approach is proposed to solve the problems noted above, and for gaining significant savings in fabrication cost. The goal is to keep the movement of the movable mirror parallel to the fixed mirror and free from tilting when the movable mirror is actuated in suspension. Instead of emphasizing mechanical control over the movable mirror in the other two degrees of freedom, the actuation and the position are transferred and controlled by an external controller, by modifying the actuation force and rotational moments applied to the movable mirror. Since electrostatic force is commonly used to actuate the movable mirror, at least two additional voltage controls are required to balance the rotational force applied to the movable mirror, relative to the two undesirable DOF. Therefore, three or more electrodes that are energized with separately controlled voltages are required. The electrodes are not limited to a specific shape or size; however, square and rectangular shapes for the electrodes are likely to be preferable due to the simplicity of their fabrication.

If the two undesirable rotational DOF are controlled through the electrostatic force, as noted above, the function of the arms attached to the movable mirror becomes extremely simple. They should restrict excessive rotation along the axis perpendicular to the mirror surface and excessive movement along the two axes that are in the plane parallel to the movable mirror, to prevent interference between the movable mirrors of neighboring modulators during the actuation. The arms should also provide an elastic restoring force to pull (i.e., bias) the movable mirror back to its un-driven position, once the actuating voltage is no longer being applied to the electrodes in the device.

It will be clearly understood that a display panel comprises an array of a plurality of such modulators. However, to provide improved clarity in the explanation of the configuration and function of the present approach, only one modulator is illustrated and discussed below, for each of the exemplary embodiments.

In the present approach, a reduced mechanical restriction makes it possible to use one (or more) spring arm(s) to keep the movable mirror in suspension. The technique is illustrated in an exemplary embodiment shown in FIG. 5A that employs two spring arms to suspend the movable mirror. Two reflective mirrors 405 and 408 define a cavity 409, forming the optical portion of an FPI modulator 401. Full spectrum light 410 from above, is incident on FPI modulator 401. Movable mirror 408 is disposed above a bottom control plate 402 that includes three spaced-apart electrodes 421, 422, and 423. Cavity 409, which is disposed between mirrors 405 and 408, is primarily controlled by the electrodes 421, 422, and 423 on the bottom plate. Two spring beams 406 are anchored to fixed posts 407. Fixed posts 407 provide support to suspend movable mirror 408 through spring beams 406, to a fixed position, when it is not driven. When voltages are applied to electrode 421, 422, and 423 to actuate movable mirror 408, the movable mirror moves downwardly, effectively increasing the depth of cavity 409. If the two spring beams 406 are perfectly balanced, movable mirror 408 should remain parallel to fixed mirror 405 when voltages applied to electrodes 421, 422, and 423 are the same. Any tilting can be eliminated by controlling differences in the voltage applied to electrodes 421, 422, and 423, so as to compensate the mechanical imbalance.

Figure 5A:
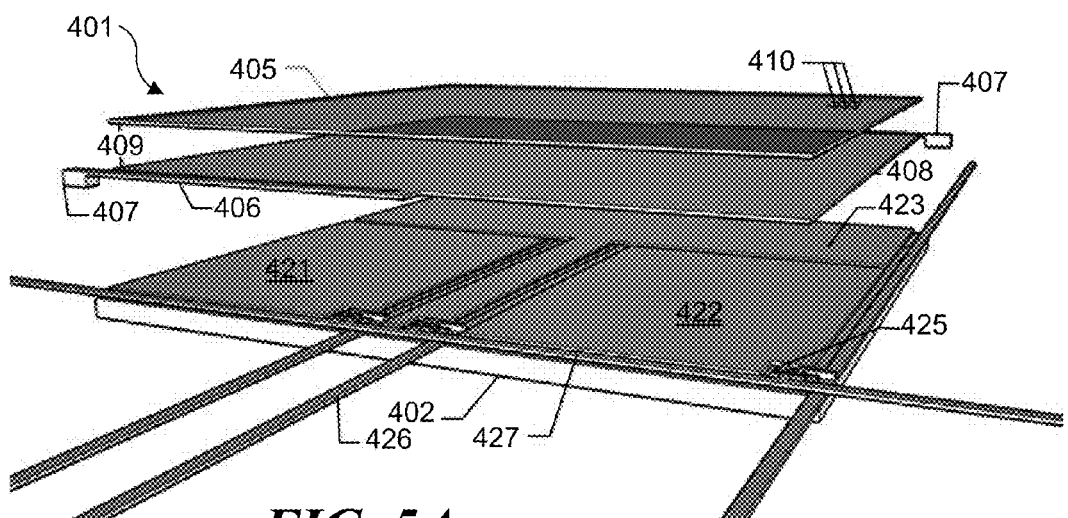
FIG. 5A is an exploded schematic view from the side of an exemplary FPI modulator using two spring arms to support a movable mirror, employing active matrix addressing, and using differential voltages applied to three electrodes to compensate any mechanical imbalance that would adversely impact tilting of the movable mirror relative to a fixed mirror.

Three thin film transistors (TFT) 425 are used for active matrix addressing to actuate an FPI modulator. As shown in FIG. 5A, three electrodes 421, 422, and 423 on bottom control plate 402 are connected to three data lines 426 and one gate line 427 through three TFTs 425 to actuate movable mirror 408. If movable mirror 408 is electrically connected as a common electrode, the three independent electrodes are sufficient to control the movable mirror in the three DOF that are of concern.

Figure 5B:
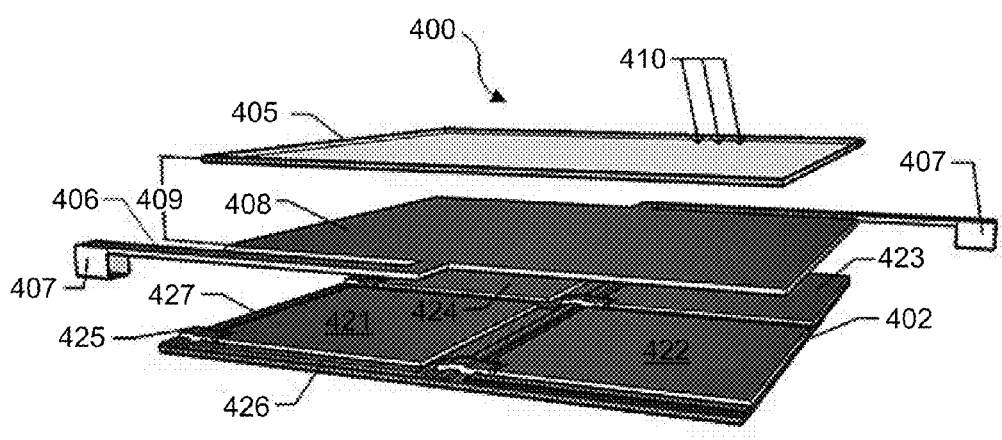
FIG. 5B is an exploded schematic view from the side of an exemplary FPI modulator using two spring arms to support a movable mirror, employing active matrix addressing, and using differential voltages applied to four electrodes to compensate any mechanical imbalance that would adversely impact tilting of the movable mirror relative to a fixed mirror.

The technique is also illustrated in an exemplary embodiment of an FPI modulator 400 shown in FIG. 5B that is identical to FPI modulator 401 in FIG. 5A, except that FPI modulator 400 uses four electrodes on the bottom plate instead of only three. An extra electrode 424 simply adds redundancy and represents an alternative that might be selected to improve operational reliability. Any tilting can be eliminated by controlling the differences in the voltage applied to electrodes 421, 422, 423, and 424 so as to compensate the mechanical imbalance.

In FPI modulator 400, four TFTs 425 are used for active matrix addressing to actuate the FPI modulator. As shown in FIG. 5B, four electrodes 421, 422, 423, and 424 on bottom control plate 402 are connected to a pair of data lines 426 and to gate lines 427 through four TFTs 425 to actuate one movable mirror 408.

The four electrodes and the TFTs used for actuating the movable mirror need not be disposed on bottom control plate 402. In other exemplary embodiments, they can alternatively be fabricated on movable mirror 408 or on top fixed mirror 405 (or a combination thereof).

Passive matrix addressing can also be used, as illustrated in FIG. 6A. Two mirrors 505 and 508 defining a cavity 509 form the optical portion of an FPI modulator 500. Full spectrum light 510 from above is incident on FPI modulator 500. Movable mirror 508 is disposed above a bottom control plate 502 that includes two spaced apart parallel electrodes 521 and 522. The depth of cavity 509 between two mirrors 505 and 508 is primarily controlled by electrodes 521 and 522 on the bottom control plate. Two spring beams 506 are anchored to fixed posts 507. Fixed posts 507 provide support to suspend movable mirror 508 through spring beams 506 to a fixed position when the movable mirror is not driven. When a voltage is applied to electrodes 521 and 522 to activate movable mirror 508, the voltage causes movable mirror 508 to move downwardly, effectively increasing the depth of cavity 509. If two spring beams 506 are perfectly balanced, movable mirror 508 should remain parallel to top mirror 505, assuming that the voltages applied to electrodes 521 and 522 are the same. However, any tilting in a direction orthogonal to the electrodes that is caused by imbalance of the spring beams (or by other forces acting on the movable mirror) can be eliminated by introducing a small appropriate voltage difference between electrodes 521 and 522 to compensate the mechanical imbalance.

Similarly, if the mechanical imbalance of the movable mirror in a direction parallel to electrodes 521 and 522 is of concern, an appropriate voltage can be applied to two supplemental electrodes 531 and 532 that are disposed on top mirror 505 to compensate the imbalance. In this configuration, electrodes 521 and 522 comprise row electrodes and supplemental electrodes 531 and 532 comprise column electrodes. Proper control of the voltages applied to two row electrodes 521 and 522 on the bottom control plate and to the two column electrodes 531 and 532 on the top plate should guarantee that movable mirror 508 moves parallel to the fixed top mirror 505 and is free from tilting about the two orthogonal axes in its plane. These compensating voltages can be determined after the modulator has been fabricated as part of a display and then subsequently can be applied, since the deviation from parallel and tilting about these two axes should not normally change over time. The position of the movable mirror is adjusted by changing the balance between the elastic restoring force provided by two beams 506 and the electrostatic force from the two pairs of orthogonal electrodes, i.e., electrodes 521 and 522, and supplemental electrodes 531 and 532.

FIG. 6B illustrates an alternative exemplary embodiment of an FPI modulator 540 that is otherwise identical to FPI modulator 500, but uses only one elastic supporting beam 506' to achieve the same goal. Accordingly, the same reference numbers are used, as in FIG. 6A. One supporting beam can effectively hold the movable mirror in place and restrict the movable mirror from deviating away from its desired position. In micro scale, gravity force is negligible in comparison to electrostatic force and other micro effects. Elastic and electrostatic forces are two dominate factors to determine the position of the plate. Again, the compensating differential voltages are applied to electrodes 521 and 522, and to supplemental electrodes 531 and 532 as appropriate to compensate for any deviation of the movable mirror that would cause it not to be parallel to the fixed mirror or to tilt about the orthogonal axes in the plane of the movable mirror.

FIG. 6C illustrates an FPI modulator 550 that uses one supporting beam 506" to achieve the same goal as in FPI modulators 500 and 540. The same reference numbers are again used for the other components as in FIGS. 6A and 6B. A spring beam 506" is disposed under movable mirror 508 and supports the center of the movable mirror. The support could be off center, so long as the electrostatic force produced by the voltages applied to the electrodes is selected to compensate. Also, spring beam 506" is designed so that its elastic restoring force is compatible with the rigidity of movable mirror 508. It will be apparent that spring beam 506" should provide enough restoring force to restore the movable mirror to its un-activated position when the voltage is removed from electrodes 521, 522, 531, and 532, but not be so strong in the force applied as to cause the movable mirror to curve when the electrodes are actuated with an applied to the electrodes.

Theoretically, controlling the three DOF requires one common electrode and three control electrodes. Having four electrodes, as shown in FIGS. 6A-6C to control a movable mirror provides redundancy to its operation, making the control more reliable. The movable plate conveniently functions as the common electrode in these exemplary embodiments. But, as noted above, a pair of electrodes can alternatively be patterned on movable mirror 508.

FIG. 6D illustrates an exemplary embodiment of an FPI modulator 560 using four supporting beams 506''' to achieve the same goal as in the exemplary embodiments of FIGS. 6A-6C, and again, the same reference numbers are used for the other components that are in common with those in these Figures. Instead of using the top plate for the two electrode rows for supplemental electrodes 531 and 532 as in FIGS. 6A-6C, the movable mirror is patterned with two rows of electrodes 581 and 582. There are only four electrodes with one pair 521, 522 on bottom control plate 502 as electrode columns and one of pair electrodes 581, 582 on movable mirror 508. In order to have a pair of electrodes on the movable mirror 508, the mirror should be of the dielectric type, with an electrically conductive and reflective coating patterned to form the two rows of electrodes 581 and 582.

An exemplary embodiment of a reflective FPI-based interferometric modulator unit 600 is designed to comprise three plates. As shown in FIGS. 7A-7B, a top plate 601, which faces the incident light 611, is transparent and has a semi-reflective mirror coating 603 on its bottom side. Any transparent materials with acceptable rigidity, such as glass, silicon, polymer, and polycarbonate, by way of example and without any intended limitation, can be used for top plate 601. Mirror coating 603, which is disposed on the bottom of the top plate 601, forms an array of interferometric modulators along with an adjacent movable mirror corresponding to a middle plate 604. The transparent media of top plate 601 functions as both a protective layer for modulator 600 and as a support for the top mirror comprising mirror coating 603. Two side-by-side electrodes (not shown in these Figures) are patterned on the top plate for correction of any non-parallel or tilt errors around either of the orthogonal axes in the plane of the movable mirror. The semi-reflective mirror coating can also be used for this function. The movable mirror of the modulator that is disposed on middle plate 604 is reflective to visible light. Middle plate 604 can be made of a suitable elastic material, such as polymer or thin metallic materials. The middle plate is either formed of an electrically conductive material or is a dielectric coated with an electrically conductive film for electrostatic actuation of the movable mirror. Middle plate 604 is parallel to top plate 601 and is patterned to have a movable plate portion 612, spring arms 616, and a fixed portion 614 that is supported on fixed posts 610. Fixed portions 614 supporting the movable plate portion of middle plate 604 are attached to top plate 601 through either adhesive bonding or by vacuum sealing. The top plate should be firmly pressed against the fixed portion of movable plate 604, where it is supported by fixed posts 610. Middle plate 604 should also be electrically isolated from top plate 601 by a layer of insulator coating, such as an atom layer deposit (ALD) using $Al_2O_3$ or other dielectric thin film (not shown). Mirror layer coating 603 on top plate 601, the reflective movable mirror of middle plate 604, and a cavity 602, which is defined between the two mirrors, form the basic optical elements of the adjustable FPI interferometric modulator when it is driven by applying an appropriate voltage.

In FIG. 7A, top plate 601 and middle plate 604 are in contact with each other when the FPI modulator is in its un-driven state, so that it reflects no visible light. When it is driven, as shown in FIG. 7B, cavity 602 is formed between the two mirrors, and the depth of this cavity determines the waveband of light reflected by the FPI modulator.

The basic elements of FPI interferometric modulator 600 rests on an array of supporting fixed posts 610, which are attached to bottom plate 605. Bottom plate 605 can be made of any electric insulator or a conductive material with an insulating layer. Thus, an integrated structure of FPI interferometric modulator 600 is formed by anchoring top plate 601, through fixed portions 614 of middle plate 604 and supporting fixed posts 610, to bottom plate 605. Movable plate 604 is maintained parallel to bottom plate 605 and is separated by a cavity 606 from the bottom plate when the movable plate is actuated by applying a voltage to the electrodes. The depth of cavity 606 is dependent on a driving voltage 608 that is applied to the electrodes. Bottom plate 605 is coated with an electrode 607 that faces upwardly and is patterned (not shown) in a plurality of areas that can be independently provided with voltages, to enable anti-tilting compensation for the movable mirror. The area of electrode 607 is generally aligned with the movable portion of movable plate 604.

Movable plate 604 is patterned with movable plate portion 612 and supported on fixed posts 610 to enable the vertical position of the movable plate to be adjusted, relative to its original position (i.e., its position when the modulator is not activated). Movable portion 612 of the movable plate is generally rectangular in shape and remains suspended by one or more supporting arms 616. The other end of supporting arm 616 is anchored to the fixed portion of middle plate 614, which is sandwiched between top plate 601 and supporting posts 610. Optionally, an array of spacers (not shown in FIG. 7A) can be placed between top plate 601 and the fixed portions 614 of movable plate to define the depth of the cavity for the modulator when it is in the un-driven state. But achieving this configuration requires one extra lithography step in the fabrication process and makes the manufacturing of the device more complicated.

The design of the embodiment shown in FIGS. 7A and 7B eliminates the spacers and simplifies the structure. The mirror on the top plate 601 and/or the movable plate is coated with a dielectric layer such as silicon oxide or an atom layer deposit (ALD) of $Al_2O_3$ film or other dielectric materials. The top plate is then adhered to fixed posts 610 before the perimeter of the display sheet is sealed. The top plate is in complete contact with the movable plate in the un-driven state of the modulator. An initiation process is required to apply sufficient voltage to the electrodes on the bottom plate, to detach movable plate 604 from the top plate (i.e., to overcome stiction) and keep the movable plate in suspension during operation of the modulator.

As shown in FIG. 7B, when a voltage 608 is applied to electrode 607 and the electrode on its opposing movable portion 612, an electrostatic force pulls the movable portion away from mirror coating 603, and toward bottom plate 605. The travel distance equals the depth of cavity 602, which varies subject to the level of voltage 608 and the restoring force provided by supporting arms 616. The traveled distance is typically controlled to be less than 0.325 micron. The supporting arms 616 act as springs that pull movable portion 612 back to its original position when the voltage is no longer applied to the electrodes.

The effect of thermal expansion, residual stress, and other manufacturing imperfections are compensated with an external control (not shown) by applying a predetermined voltage differential to the multiple portions of the electrodes when the modulator is actuated. The appropriate differential voltage to compensate for non-parallel and other deviations can be determined during the manufacturing process and then stored for subsequent application when the modulator is being used.

FIG. 8 is a graph 700 that shows an example of theoretical voltage-displacement relationship for movable mirror 508 in FIGS. 6A-6D. The movement at the tip of the supporting beam can be theoretically determined by adding the displacements from the long and short sides of the "L" shaped supporting beam under a force and torsion. The equilibrium condition is shown in the following equation.

$$k\Delta = \alpha \frac{\varepsilon A V^2}{2(h-\Delta)^2} \quad (4)$$

where $\Delta$ is the displacement, A is the area of the plates, $\varepsilon$ is the dielectric constant of air, V is the voltage, h is the original distance between the plates, and $\alpha$ is a constant. In this particular case, the spring constant k is calculated as:

$$k = \frac{2}{(l^3+L^3)/(3EI)+l^2L/(KG)} \quad (5)$$

where E is modulus of elasticity of the L-shaped supporting beam, l is the long edge of the L-beam, L is the short edge of the L-shaped supporting beam, G is rigidity of the L-shaped supporting beam, and K is a constant defined as:

$$K = ba^3 \left\{ \frac{1}{3} - 0.21\frac{a}{b}\left[1 - 0.083\left(\frac{a}{b}\right)^4\right] \right\} \quad (6)$$

where a and b are the width and height of the cross-section. I is the cross-sectional moment of inertia expressed as $$I = \frac{ba^3}{12},$$

yielding:

$$V = 2(h-\Delta)\sqrt{\frac{\Delta}{\alpha \varepsilon A[(l^3+L^3)/(3EI)+l^2L/(KG)]}} \quad (7)$$

Eq. (7) shows that there is a deterministic relation between the displacement of the movable plate and the voltage applied, once the materials and the structure of the pixel are fixed. Note that h is the effective distance between the two mirrors with a dielectric disposed between the mirrors. Pull-in displacement and the voltage are calculated as $$d_{pi} = \frac{h}{3} \text{ and } V_{pi} = \left(\frac{4kh^3}{\alpha 27\varepsilon A}\right)^{\frac{1}{2}},$$

respectively.

Eq. (7) shows that the relationship between pixel color and voltage is continuous and analog. Adjusting the magnitude of the voltage can directly control the color of a pixel unit in a display comprising a plurality of these modulators. Since there is no surface contact when a pixel is actuated, the stiction condition commonly experienced in MEMS structures is eliminated.

MEMS Processes

The conventional lithography technologies are mature and readily available for constructing the three-plate display structures containing an array of color modulators. The bottom plate is first patterned with an array of electrodes through masking, pattern transfer, and etching processes. The middle movable plate can be made of thin metallic foil such as aluminum or using a thin elastic dielectric film coated with a light reflective and electrically conductive layer. It is patterned to form the structures and released from a sacrificial layer after desirable patterns are developed. The top plate is prepared separately by simply coating a thin metal layer to form a semitransparent mirror. If three electrodes are patterned on the bottom plate in one column for each of the modulators, and if the movable plates of adjacent modulators form electrically connected rows, there is no need for electrodes on the top plate. Therefore, the top plate can simply be a dielectric stack without an electrode. Alternatively, a pair of electrode strips for each column of the display can be patterned on the top plate. After the bottom plate and the middle plate are prepared, the top plate is attached directly through either adhesive bonding at the posts or simply through a vacuum seal. The perimeter of the panel is then sealed to finish the assembly of the display.

Figure 9A:
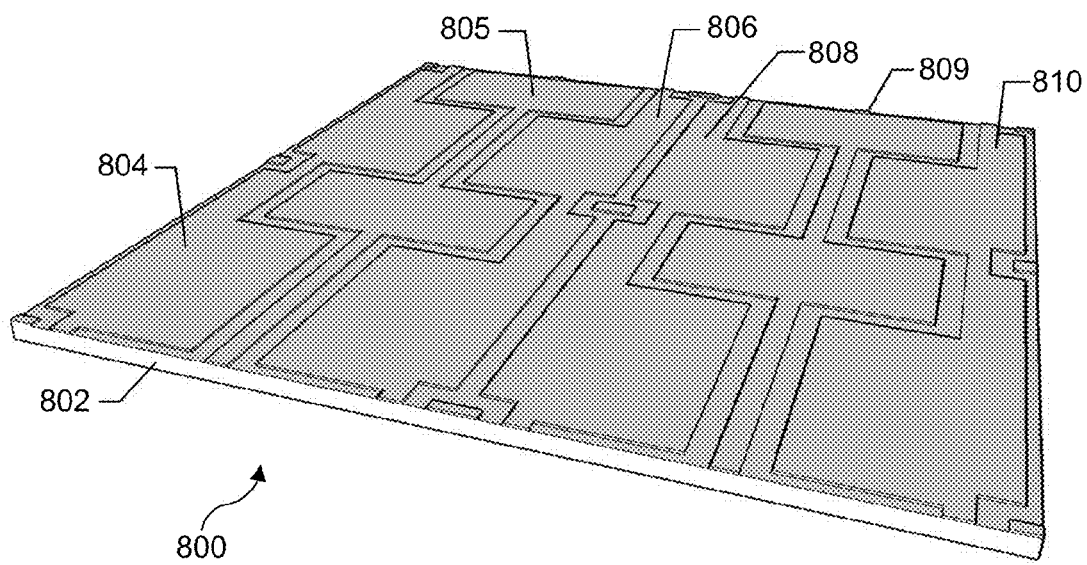
Figure 9B:
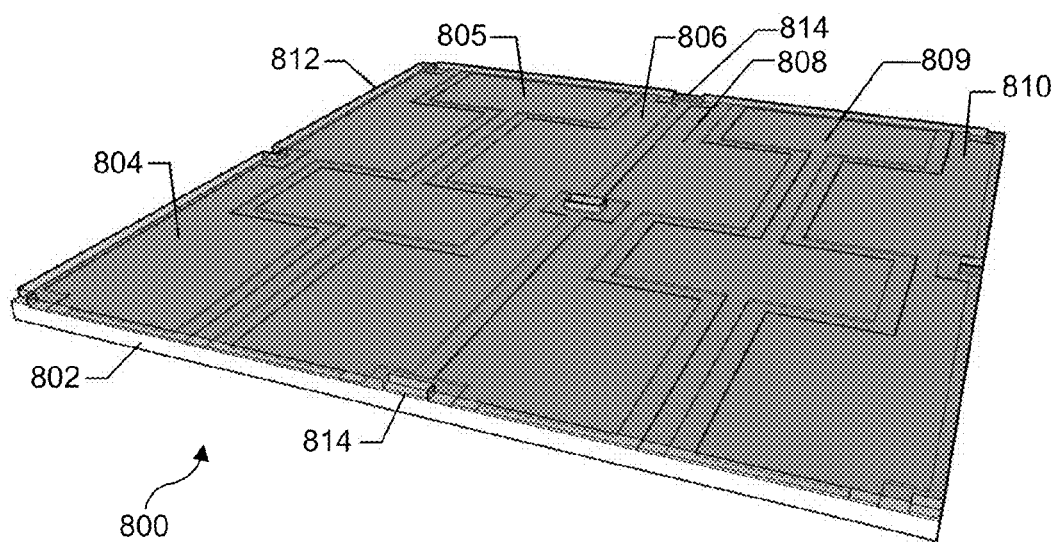
Figure 9C:
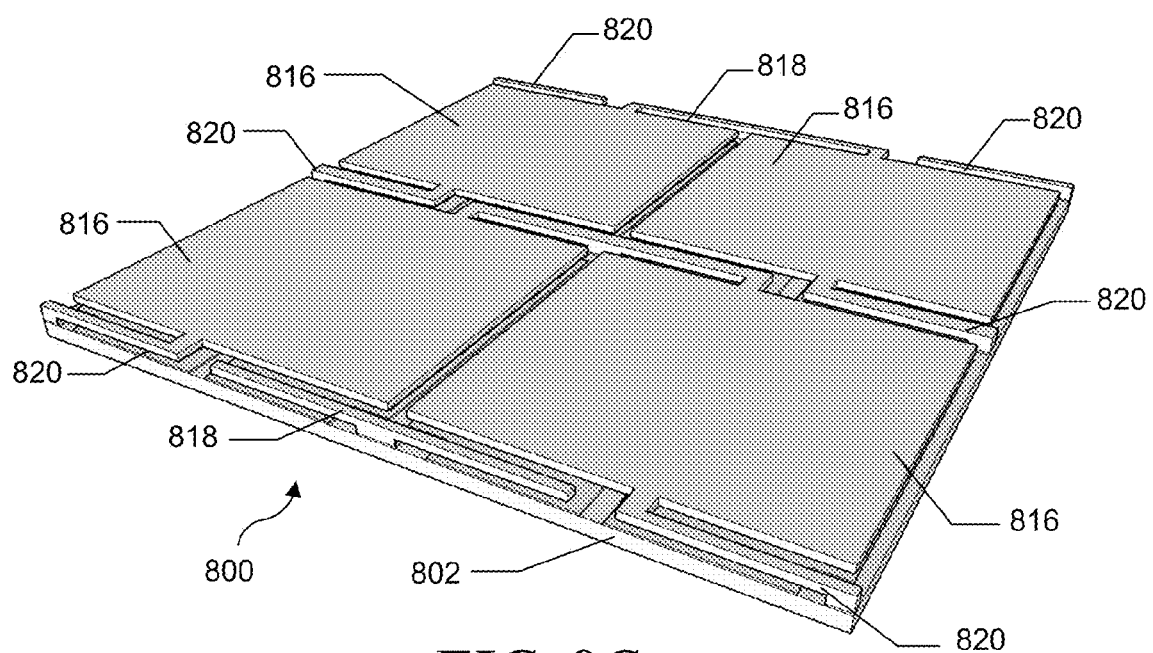
Figure 9D:
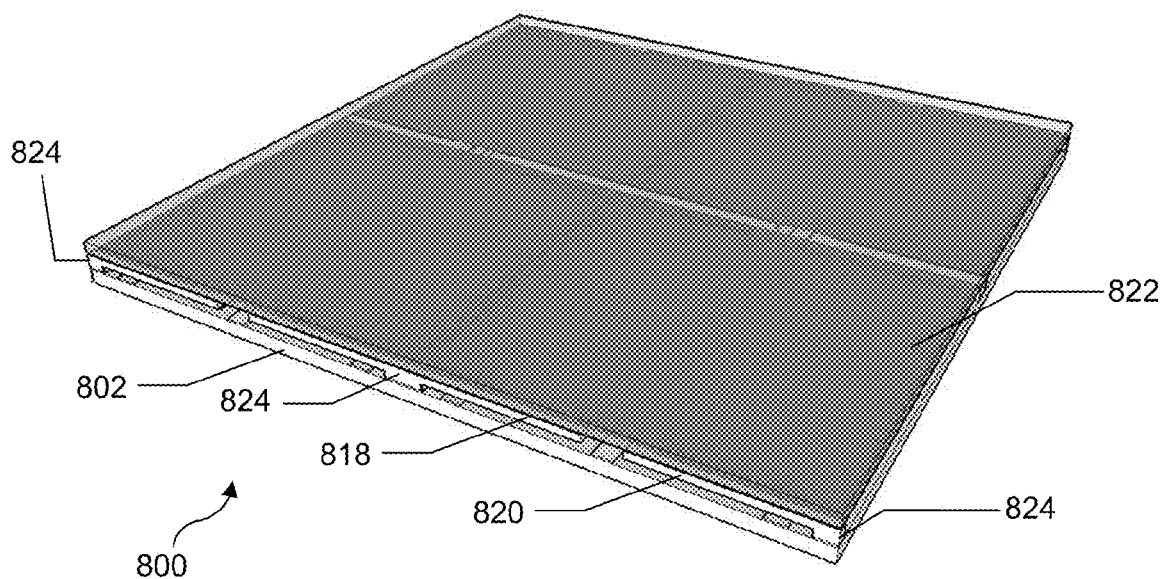

One exemplary embodiment for a modulator structure 800 that functions as discussed above is manufactured in accord with conventional MEMS lithography processes, following the steps shown in FIG. 9A-9D. The Figures only show two adjacent rows and two adjacent columns of modulators for clarity, which can provide only four pixels. A bottom plate 802 has a dielectric substrate or electric conductive substrate coated with a dielectric layer (not separately shown). The bottom plate is patterned with columns of electrodes 804, 805, and 806, and 808, 809, and 810 by deposited metal and using a spin-coated sacrificial photoresist mask layer. As shown in FIG. 9A, there are three columns of electrodes 804, 805, and 806 for one column of modulator units, and three columns of electrodes 808, 809, and 810 for the other column of the modulator units. The three electrodes of a column are asymmetrically patterned in respect to the two orthogonal axes on the plate. The shape of the electrodes is shown as rectangular, but other shapes are also applicable. Once the electrodes are made, a layer of photoresistive film 812 is applied to the bottom plate, to a thickness of one micron or greater. The photoresist mask layer is patterned with small rectangular holes 814 to form anchor posts for the movable plate, as shown in FIG. 9B. A metal layer with good light reflective characteristics (e.g., a metal such as aluminum, silver, or suitable metal alloy) is applied over the photoresistive layer through sputtering or other means. Dielectric material can also be used for this layer, but an electrically conductive film also needs to be provided. The layer is then coated with another layer of photoresistive film, and the pattern of movable plates 816 and supporting beams 818 and 820 is transferred before an unwanted part of the metal film is etched away. The movable plate is patterned in such a way that each plate in a row forms an electrically conductive row and is electrically isolated from other electrode rows in the modulator. The photoresistive residuals are then cleaned away, yielding the result shown in FIG. 9C. A top plate 822 is also prepared separately by depositing a thin film of highly reflective metal, such as aluminum, or alternatively, a dielectric mirror stack. If an electrically conductive film is used, the top plate is then coated with a thin layer of a transparent insulator, such as silicon oxide or $Al_2O_3$ by direct deposition or atom layer deposit (ALD), which is not shown in the Figures. Alternatively, the middle plate prepared thus far can be coated with a dielectric layer. Top plate 822 is then attached to support posts 824 on the middle plate as shown in FIG. 9D. The display panel is then bonded and sealed to finish the assembly.

FIG. 10A-10F shows another exemplary embodiment of a modulator structure 900 that can be readily fabricated using conventional MEMS lithography processes. Like the embodiment of FIGS. 9A-9D, a base substrate 902 is selected to be either a dielectric or an electrically conductive material that is coated with a thin layer of a dielectric film 903. The plate is patterned with columns of electrodes 904 and 906, and 908 and 910, and with an array of isolated squares 912 for mounting the beams and supports, as discussed below. For simplicity and clarity, again, only four pixel units are shown.

Figure 10A:
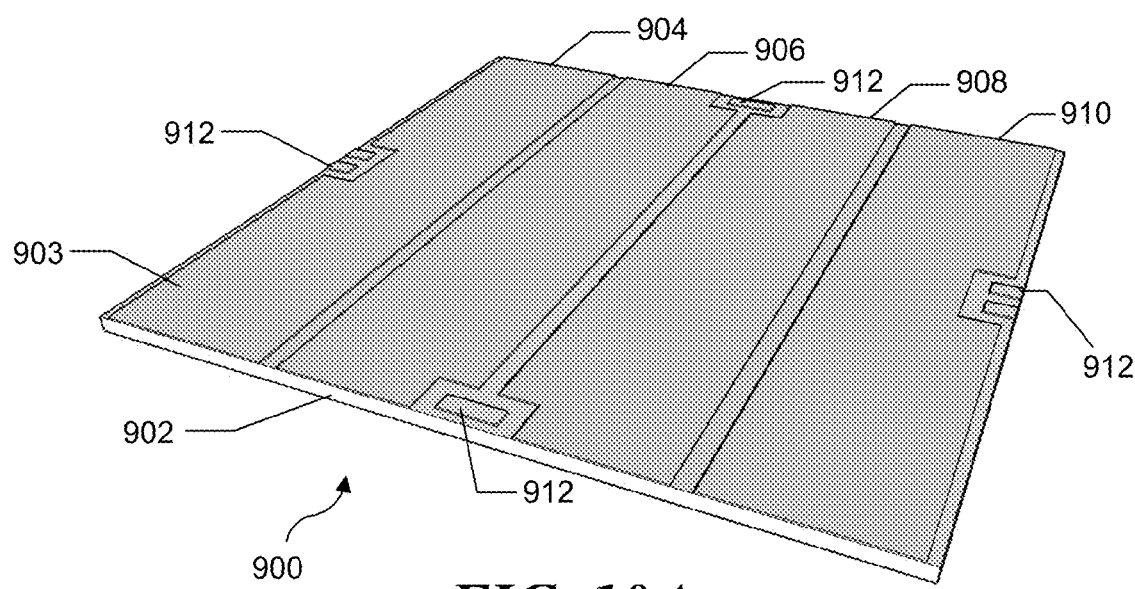
Figure 10B:
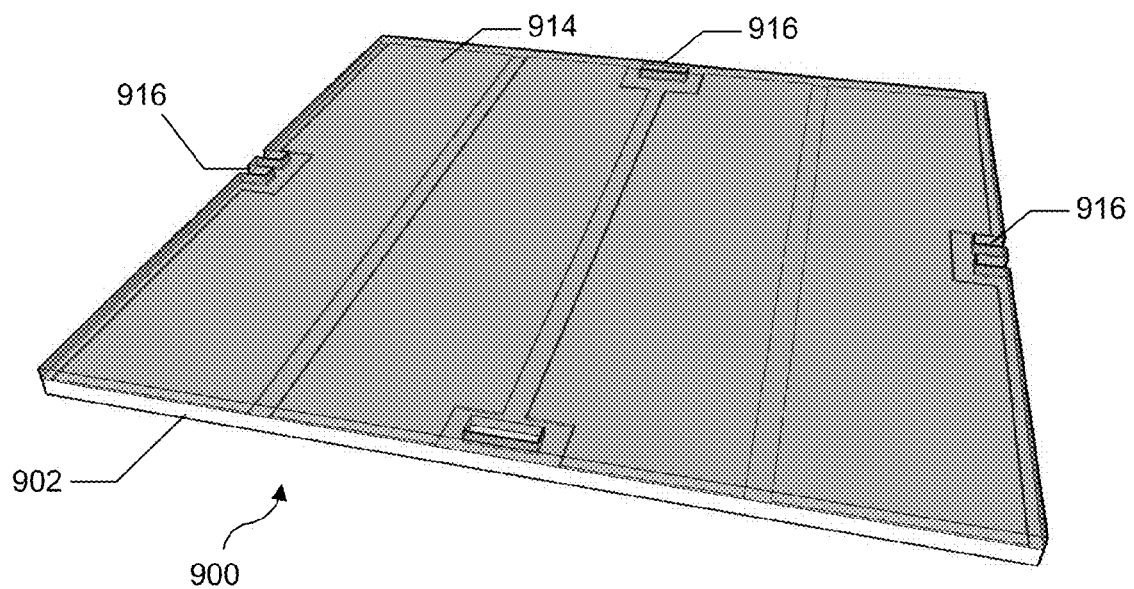
Figure 10C:
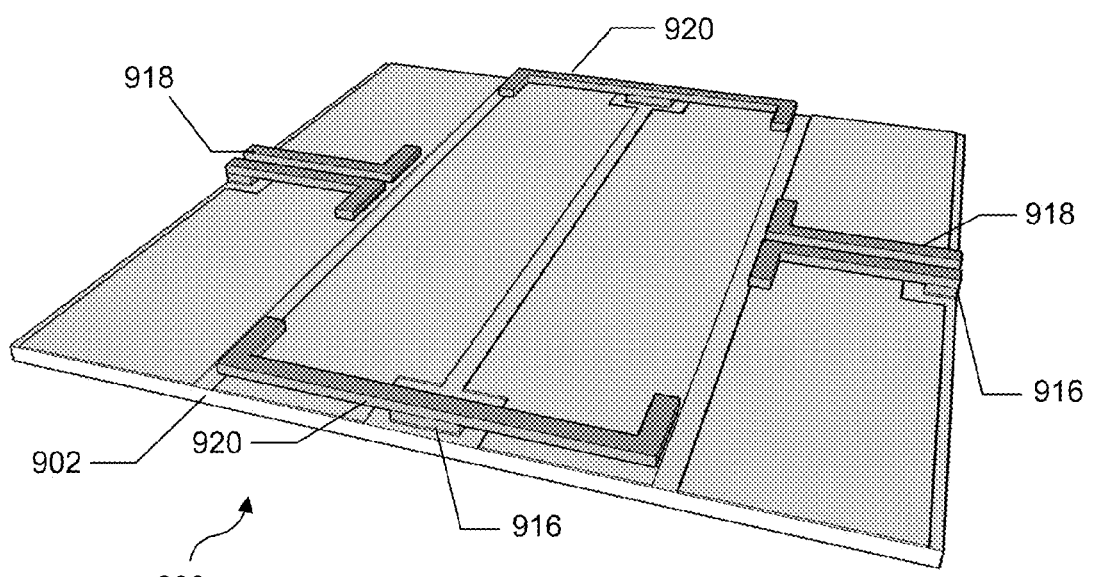
Figure 10D:
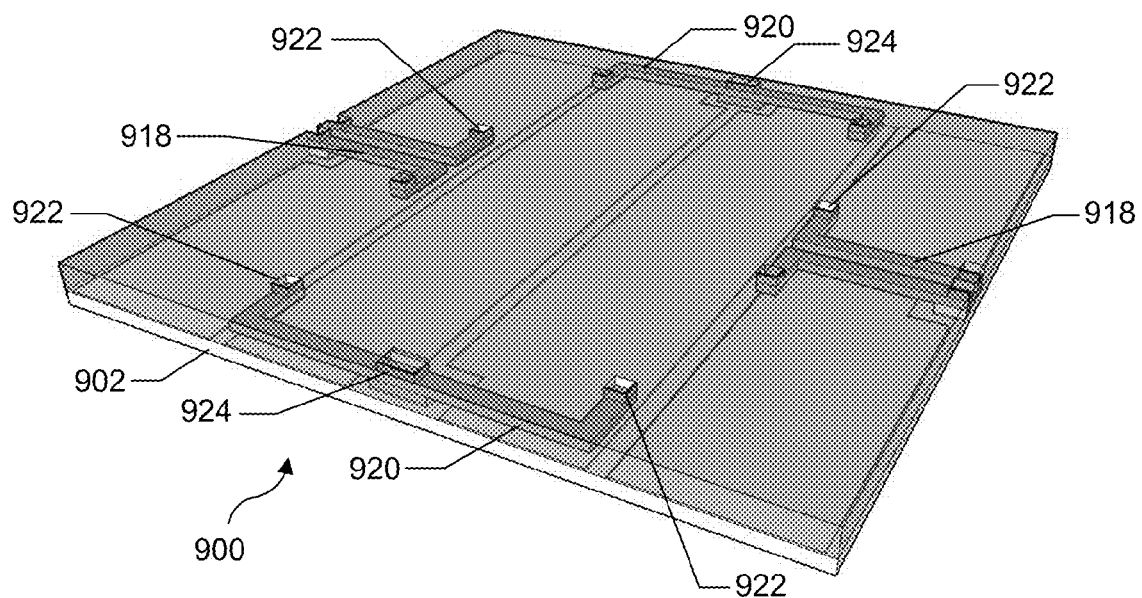
Figure 10E:
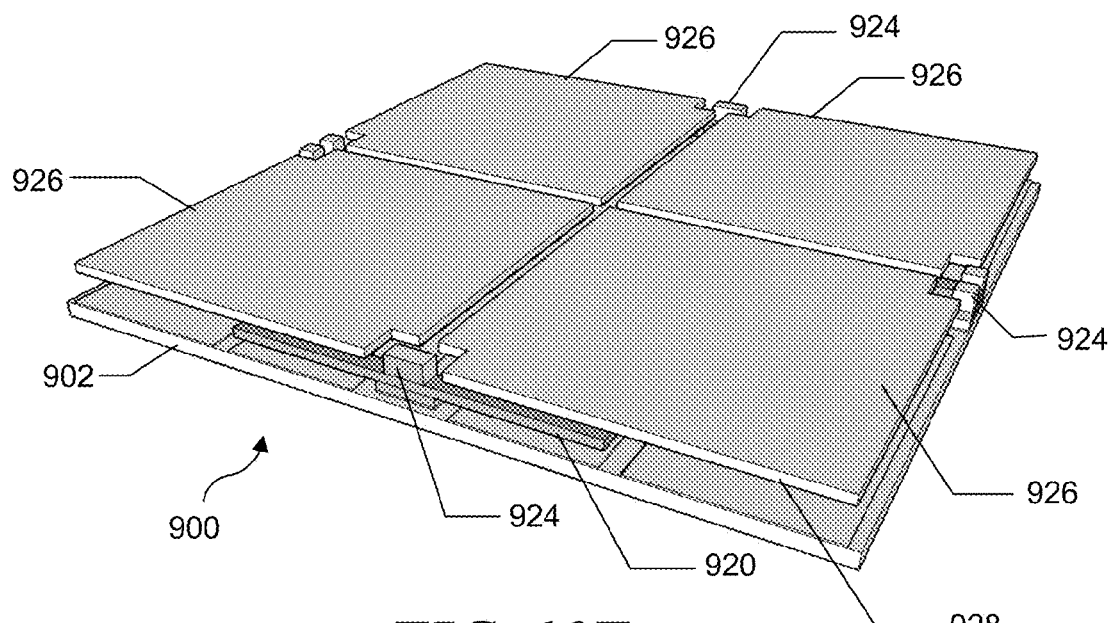
Figure 10F:
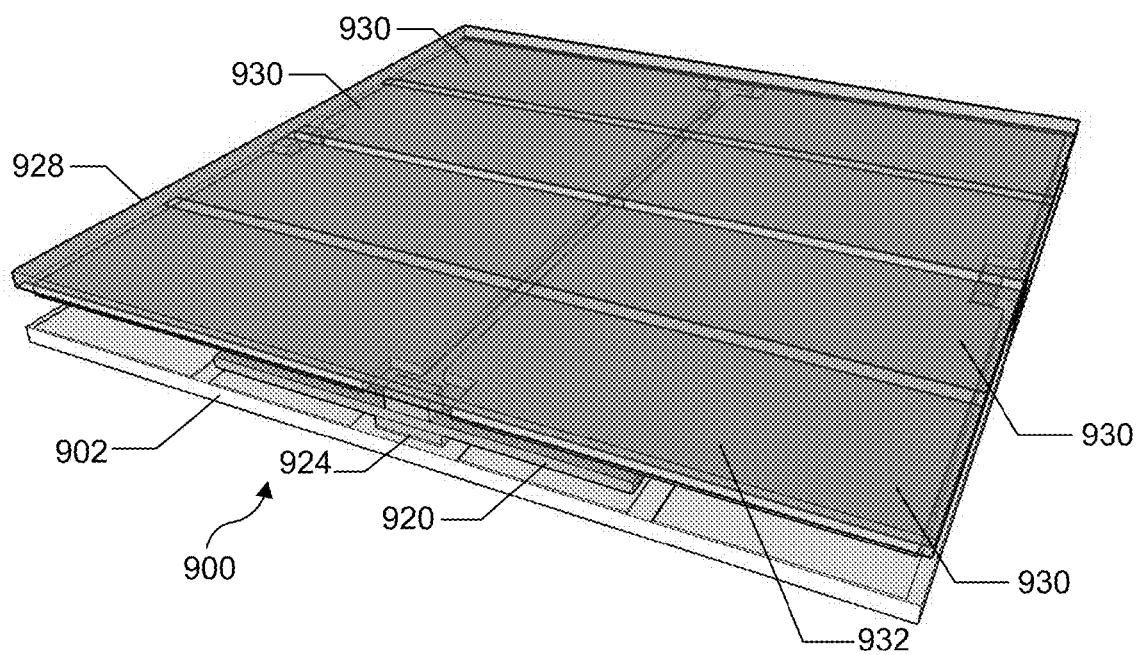

The plate is then coated with a photoresist mask layer 914 and an array of supporting posts 916 is patterned as shown in FIG. 10B. A layer of metal or alloy is deposited on the mask and the layer is then patterned to form spring beams 918 and 920 as shown in FIG. 10C. Another photoresist mask layer is patterned to form posts 922 on the spring beams as well as supporting posts 924 as shown in FIG. 10D. The layer of conductive and reflective material is deposited and then patterned to form an array of mirrors 926 on a middle plate 928 as shown in FIG. 10E. A top plate is 928 also prepared separately by depositing a thin film of highly reflective metal such as aluminum. The thin film is patterned to have a pair of electrode rows 930 for each row of modulator units. The top plate is then coated with a thin layer of transparent dielectric film 932 such as silicon oxide or $Al_2O_3$ by direct deposition or atom layer deposit (ALD). Alternatively, the middle plate prepared thus far can be coated with a dielectric layer. The top plate is then aligned and attached to the support posts on the middle plate, as shown in FIG. 10F. The display panel is then bonded and sealed to finish the assembly.

Figure 11A:
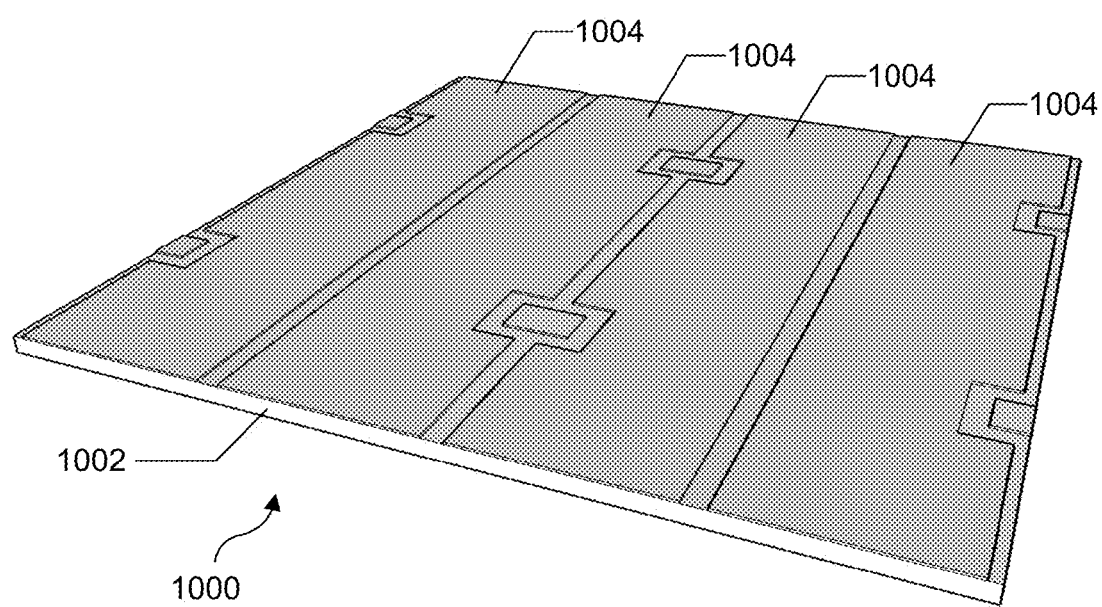
Figure 11B:
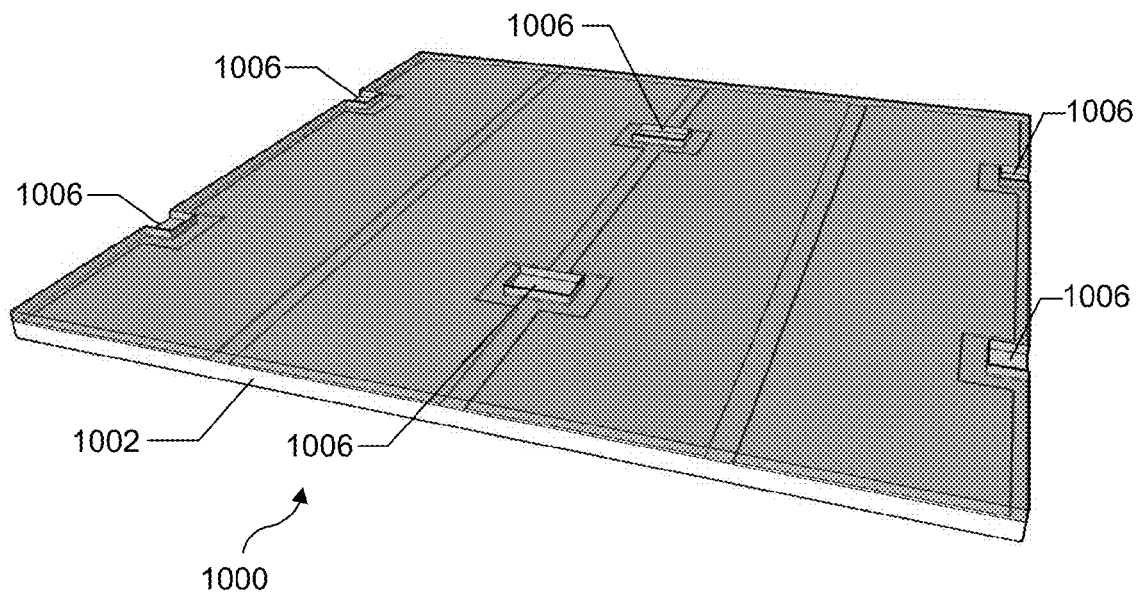
Figure 11C:
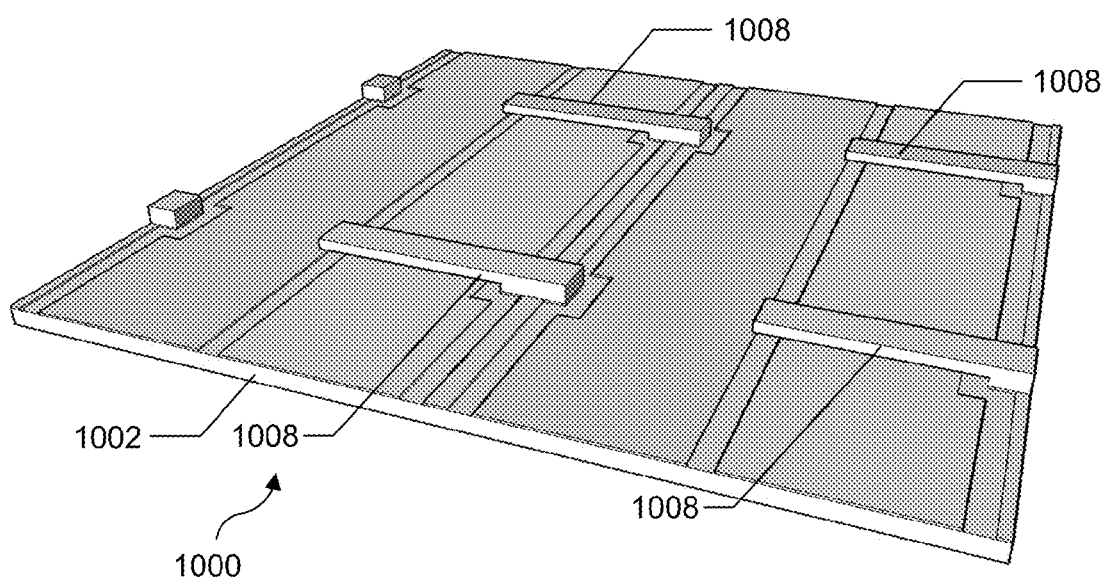
Figure 11D:
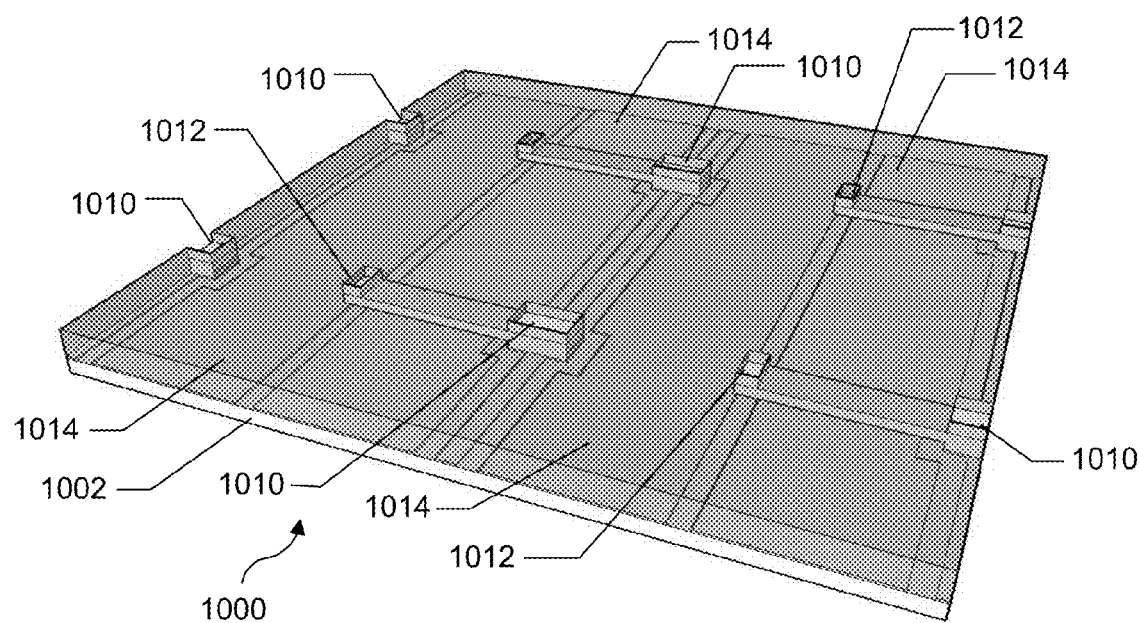
Figure 11E:
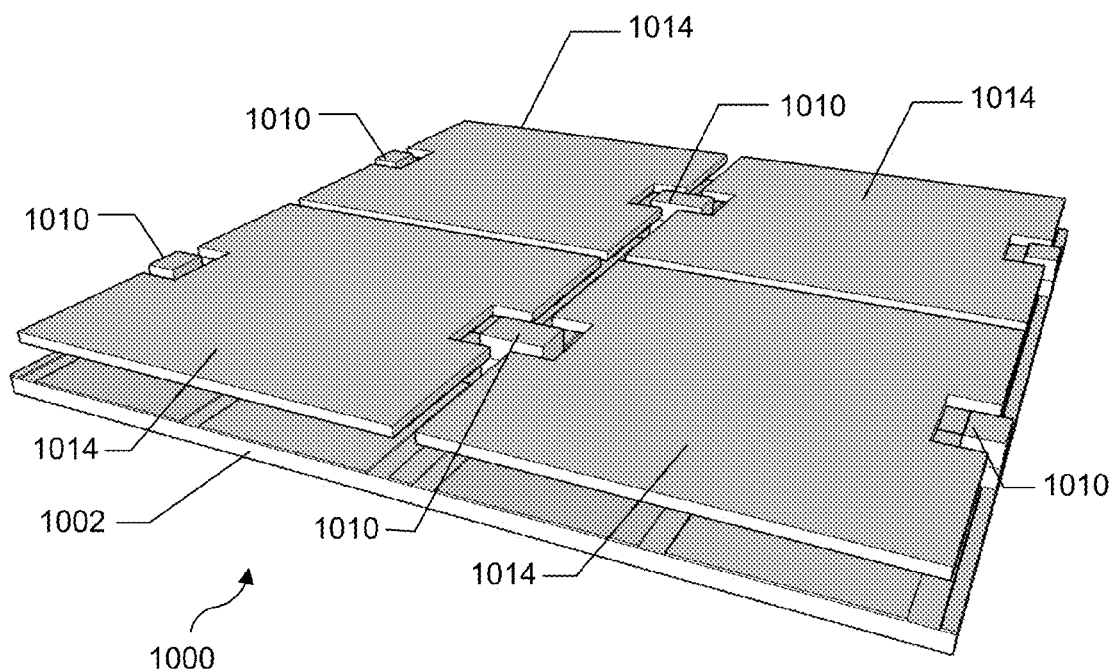
Figure 11F:
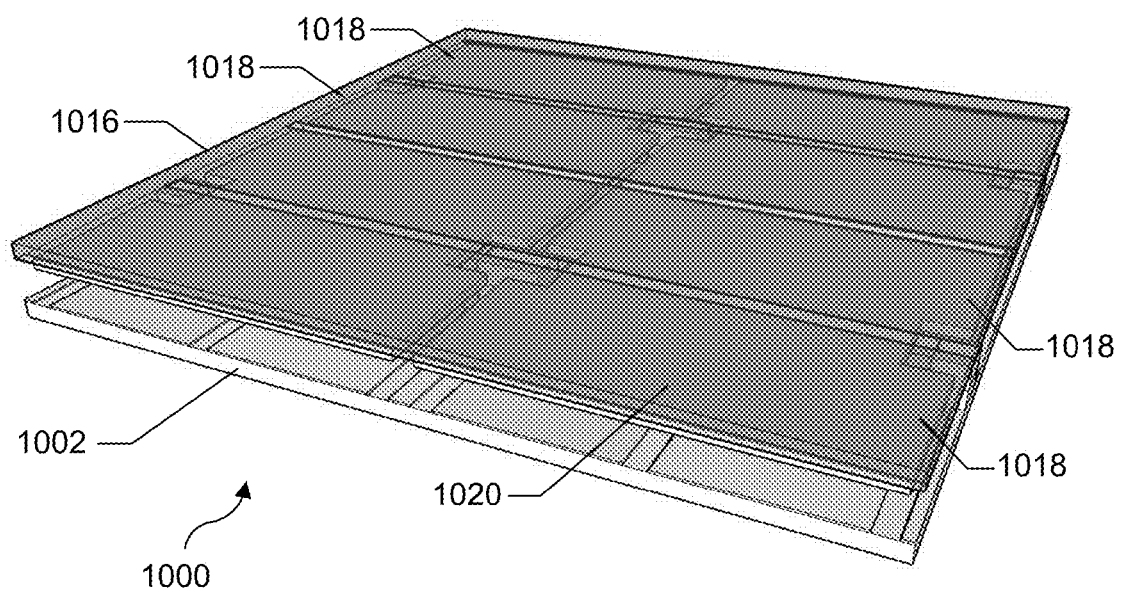

Another alternative exemplary embodiment 1000 uses a single spring beam for actuation as shown in FIG. 11A-11F. Again, only four pixels are shown for simplicity. A bottom plate 1002 is patterned with four columns of electrodes 1004, as shown in FIG. 11A. The plate is then coated with a photosensitive layer and the patterns of an array of supporting posts 1006 are transferred as in FIG. 11B before the layer for spring beams are deposited. The patterns of spring beams 1008 are then transferred to the layer, as shown in FIG. 11C. The plate is coated with another photoresist mask layer and a reflective and conductive layer is deposited on top of the patterned photoresist layer to form posts 1010 and 1012, and movable mirrors 1014, as shown in FIG. 11D. The thickness of the photoresist mask layer and the beams are designed in such a way that the deformation of the mirrors is minimized when actuated with voltage applied to the electrodes. After the deposition, another photosensitive layer is applied as a coating, and the pattern of the mirrors is transferred to leave small gaps between the mirrors. The gap is then etched away to form the movable mirrors 1014 as shown in FIG. 11E. A top plate 1016 is also prepared separately by depositing a thin film of highly reflective metal such as aluminum. The thin film is patterned to have two rows 1018 for each row of modulator units as the top electrodes. The top plate is then coated with a thin layer 1020 of transparent insulator such as silicon oxide or $Al_2O_3$ by direct deposition or atom layer deposit (ALD). Alternatively, the middle plate prepared thus far can be coated with a dielectric layer. The top plate is then aligned and attached to the support posts on the middle plate as shown in FIG. 11F. The display panel is then bonded and sealed to finish the assembly.

The top plate is attached to the bottom part by either heat or adhesive bonding to the supporting posts. The adhesive layer can be patterned to match the locations of the supporting posts on the top mirror. To prevent the movable plate unintentionally becoming attached to the top mirror during the bonding process, the movable mirrors can be actuated by applying a voltage between the electrodes and the movable mirrors so that only the top plate rests firmly on the supporting posts for bonding, during the manufacturing process.

Figure 12A:
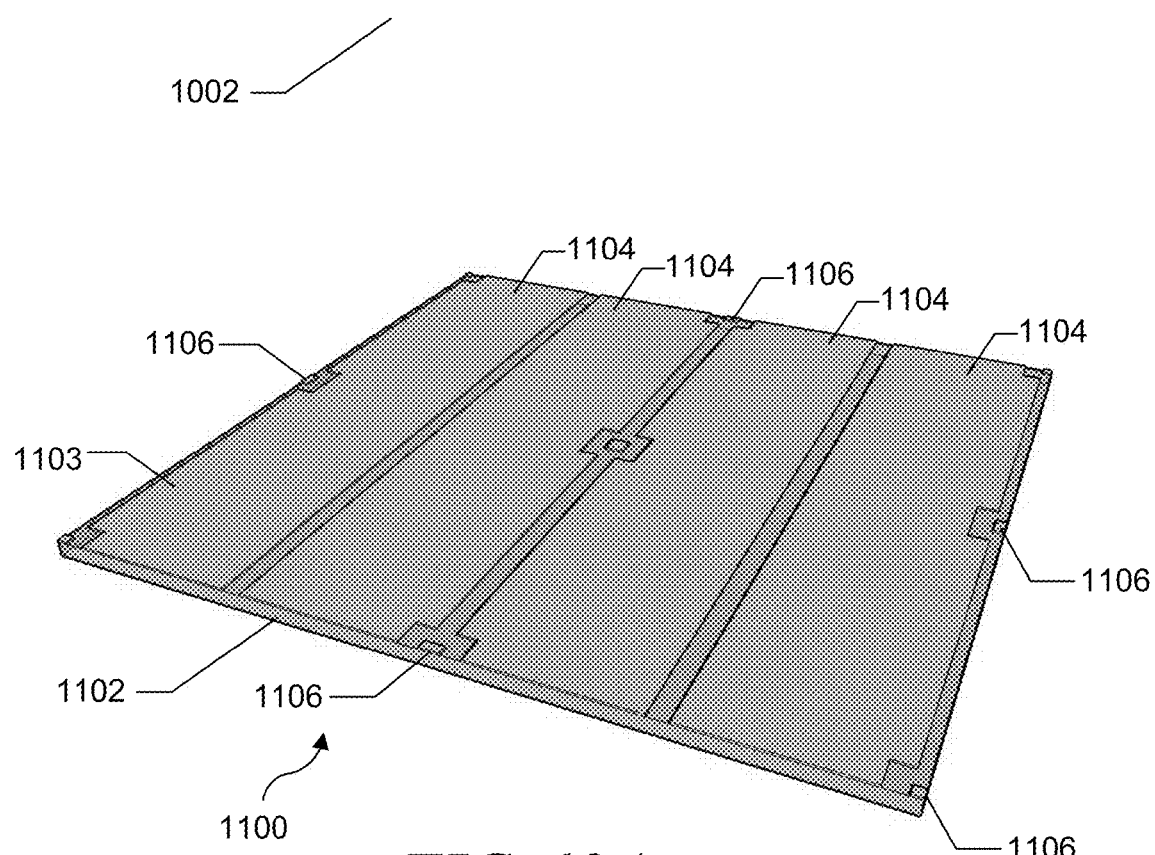
Figure 12B:
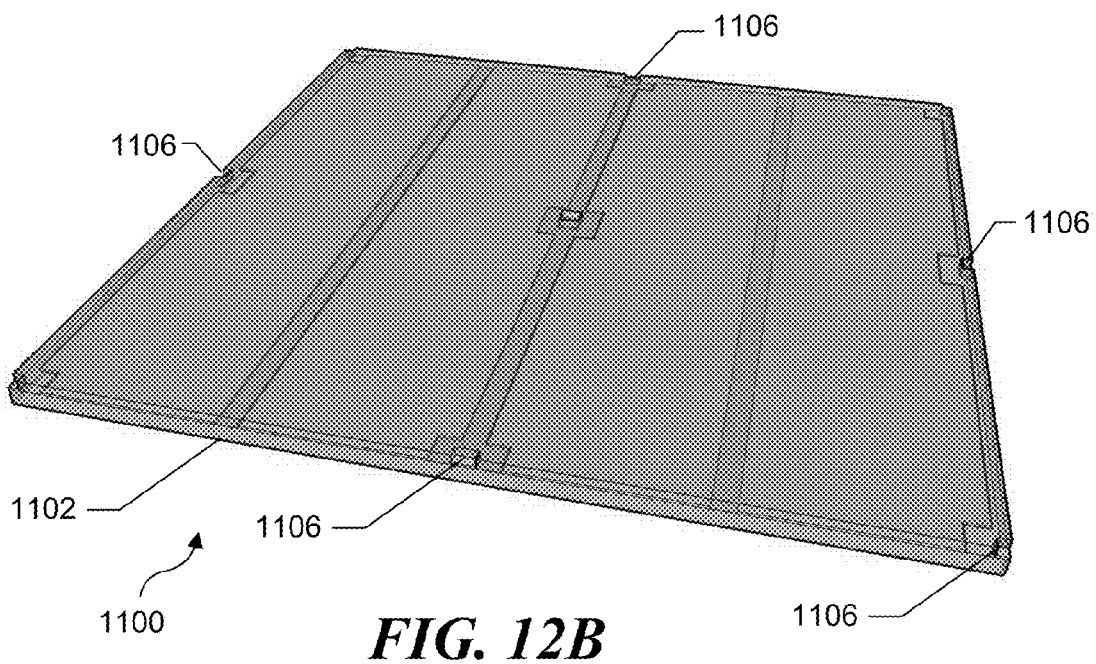
Figure 12C:
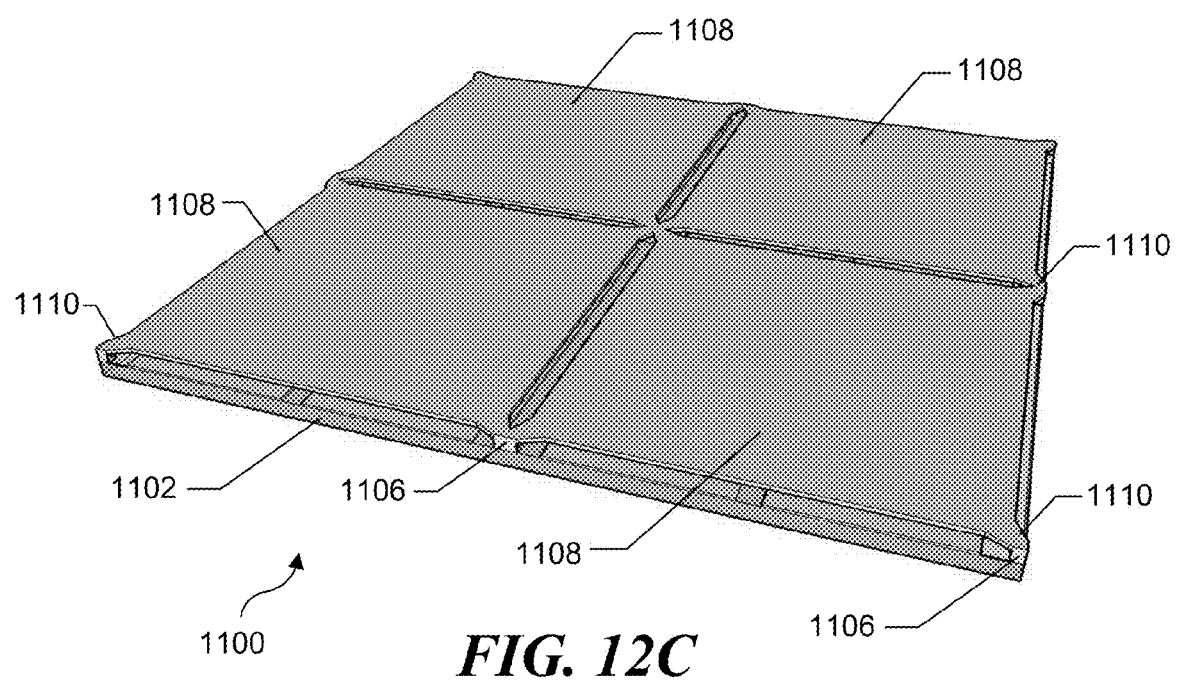
Figure 12D:
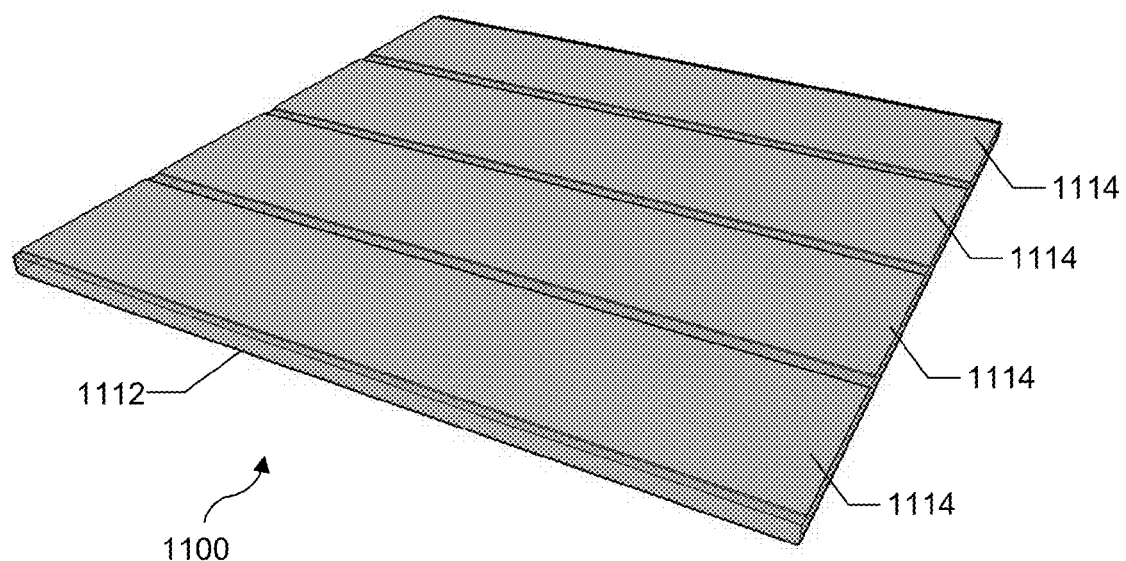
Figure 12E:
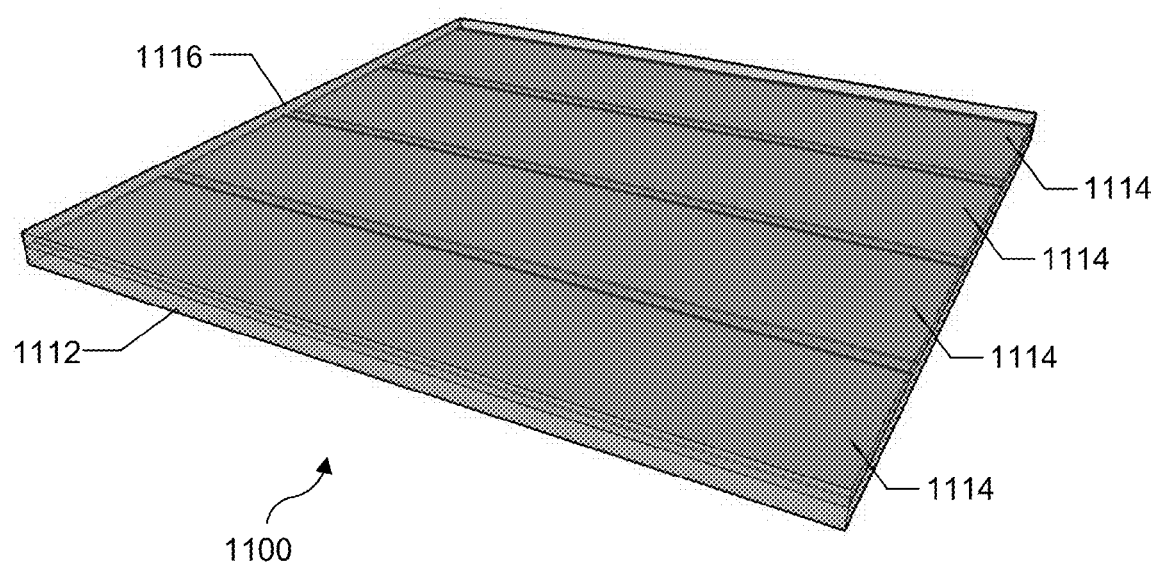
Figure 12F:
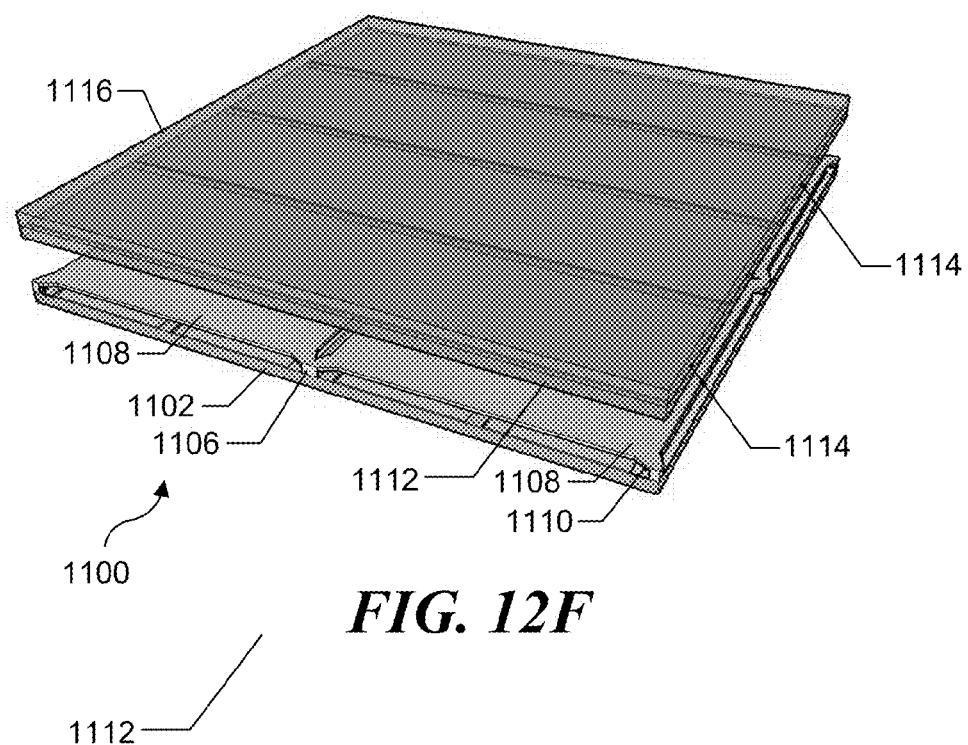
Figure 12G:
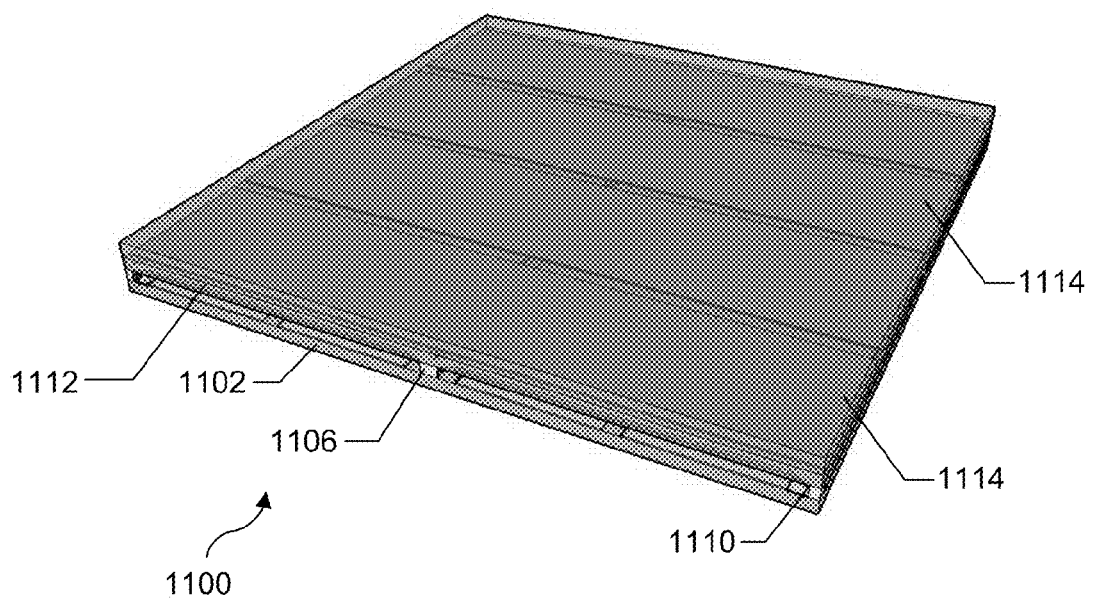

FIGS. 12A-12G show an exemplary embodiment 1100 in which a modulator structure is built on transparent media. A transparent plate 1102 is positioned as it would be oriented to face toward incident light. It is first coated with a semi-reflective mirror patterned with rows of electrodes 1104. Each row of pixels has a pair of electrode rows. An array of supporting posts 1106 is also patterned on the plate as shown in FIG. 12A. After patterning the mirror and electrode layer, a photoresist mask layer is spin coated on plate 1102, and patterns of supporting posts 1106 are transferred to the mask layer as shown in FIG. 12B. A layer of elastic film is deposited on the patterned layer. The film should be reflective and is either electrically conductive or is coated with a conductive dielectric layer. Another photoresist mask layer is coated on the film and patterns of movable plates 1108 and tether arms 1110 are transferred to the film, as shown in FIG. 12C. Next, a base plate 1112 is patterned with columns of electrodes 1114 as shown in FIG. 12D. A dielectric layer 1116 is then coated on the plate as shown in FIG. 12E before joining the two plates, as shown in FIG. 12F. The two parts are aligned in place as shown in FIG. 12G. The display panel is then sealed to finish the assembly. The modulator of the display panel illustrated in FIGS. 12G is controlled with two pairs of orthogonal electrodes 1104 and 1114.

In an analogous manner, FIGS. 13A and 13B shows how modulator 600 is operated. Incident light 611 from above hits the display panel comprising modulator 600. As noted above, FPI interferometric modulator 600 includes semi-reflective coating 603 on transparent plate 601 and reflective movable portion 612, on opposite sides of cavity 602. The semi-reflective coating is also patterned with a pair of electrodes for each row of modulators. The movable plate is at rest against dielectric layer 606 that is coated on bottom plate 605 and which includes a pair of electrodes 607 separately defined within the layer. There is a pair of electrodes for each column of modulators in the display. The pair of electrodes on top plate 601 and the pair on bottom plate 605 are orthogonally oriented relative to each other. As shown in FIG. 13A, the modulator is in an un-driven state and the movable portion is in contact with dielectric layer 606. In this state, the depth of cavity 602 is much greater than that usable to resonate with visible light.

The modulator is initiated first by applying voltage 608 to the electrodes on the two pairs of electrodes patterned on semi-reflective coating 603, to detach movable portion 612 and pull it into suspension, as shown in FIG. 13B. The depth of cavity 602 can be adjusted to resonate with desirable visible light. The tilting of the movable plate 612 can be corrected by adjusting voltages 608 and 609 that are respectively applied to the two pairs of electrodes.

Color Dithering and Calibration

Because each modulator on the display panel is structured so that it is not limited to producing a single color, complex colors for each pixel can optionally be realized through spatial, temporal, or hybrid dithering using the color subtraction method (e.g., CYMK) by use of an appropriate external driver to control the voltages applied to the electrodes in the modulators of the display panel.

The non-contact actuation makes it possible for each modulator unit to represent a full color pixel using temporal color dithering, which reduces the cost and complexity of the display panel, compared to spatial color dithering, in which different primary colors are provided by closely spaced modulators at each pixel position. However, conventional spatial color dithering can still be implemented even if it is not necessary. For example, if spatial color dithering is preferred, three neighboring modulators can be grouped to form one color pixel, with each modulator dedicated to toggle between a specific primary color and black.

Since each modulator can represent a full color pixel, a wide range of visible colors can be produced by using temporal color dithering, so that the modulator displays a sequence of primary colors by altering them quickly. The speed at which each distinct color is produced by the modulator is much faster than the temporal sensitivity of the stimuli for the human eye. The human eye, unable to distinguish the individual colors, perceives the color mixtures together as the desired color for the pixel. Pulse width modulation (PWM), which is commonly used for temporal color dithering, causes each primary color to be displayed for varying very brief periods of time to produce color mixtures. Because each modulator functions as a full color pixel, display resolution is extremely high. However, the modulators are required to have a very high response speed, e.g., so that all of the primary colors that are produced must be combined to stimulate the human eye to perceive the desired color, within a total time of $\frac{1}{60}$ second.

In a spatially dithered pixel, colors are approximated by the diffusion of different primary colored sub-pixels from within the available palette. At least three adjacent modulators are used as sub-pixels to form a full color pixel in the spatial dithering approach. Each sub-pixel is dedicated to a particular primary color and it switches back and forth quickly between black and the designated color. The human eye perceives the combined colored sub-pixels as a mixture of the colors that are perceived as the desired color for the pixel. By using different proportions of primary colors in the spatial dithering approach, a wide range of visible colors can be produced. The response speed requirement for the modulator is not as high in spatial dithering as for the temporal dithering, but displays that use spatial dithering with a closely spaced group of modulators achieve lower spatial resolution.

Hybrid color dithering can be achieved using combinations of temporal and spatial dithering methods. Since each reflective interferometric modulator can be used for either dithering method, hybrid color dithering displays can be designed to maximize color depth, while maintaining satisfactory spatial resolution.

The temporal color dithering is preferable since it achieves the higher resolution, compared to conventional spatial color dithering, at least applying a comparable manufacturing precision requirement. Temporal color dithering also takes advantage of the fast response speed of the MEMS modulators. The modulators are then controlled to switch states between the primary colors with a refresh rate that is appropriate to produce any desired colors.

An array of electrodes on the bottom plate is behind the reflective units to control the position of the movable plates. The simplest addressing mechanism is the passive matrix technique, which requires electrodes to be aligned in rows on the bottom plate and columns on the movable plate or the top plate or vice versa. In addition, the electrodes on the top plate add additional flexibility in controlling the plate movement. If a thin-film transistor (TFT) backplane is used as the bottom plate, the movable plate is aligned to the electrodes on the TFT plate for actuation with the applied voltage.

Despite carefully controlled manufacturing process, color modulators may not be completely consistent and uniform. As a result, a specific voltage applied to different modulators may result in different cavity depths in the modulators due to uncontrollable factors such as material inconsistency and manufacturing inaccuracy. Efforts required to control these factors would add prohibitive cost to the display panel manufacturing process. Therefore, a correction mechanism is necessary and valuable in compensating for these factors that are not readily controllable, so that the end product achieves desirable color uniformity.

The pixel driver control is designed not only to achieve color dithering, but also to correct any inevitable manufacturing deviations in the above mentioned three DOF, so that the position of the movable plate or mirror is controlled precisely and so that it is free from tilting relative to the fixed mirror. Color modulation and correction is realized through analogue voltage compensation applied to the electrodes, as follows.

A display panel is calibrated after it is manufactured. A series of voltage combinations is applied to a modulator to establish a relationship between the voltages and the color reflected by the modulator. There are potentially four voltages (for example, using the exemplary embodiment of FIGS. 6A-6D) that can be applied to a modulator for the two pairs of orthogonal electrodes, including the two row electrodes on the bottom plate and the two column electrodes on the top plate or movable plate depend on the embodiment of choice (or vice versa in regard to the disposition of the rows and columns). Each primary color for pixel m, n can be calibrated as a function of a voltage V, which is a vector with four components. There are four states for each modulator, representing cyan, magenta, yellow, and dark (CMYK), respectively (or red, green, blue, and dark for RGB). Potentially, a different voltage relationship (i.e., different compensation voltages for the four electrodes) may be needed to prevent tilting of the movable mirror relative to the fixed mirror, for each modulator in a display panel, but in practice, a common voltage relationship can represent a group of modulators due to the fact that modulators on a display panel are subject to similar manufacturing conditions. The modulators having voltage relationships that are about the same are placed in the same group. The voltage relationships for each different group of modulators are then stored and indexed in the driver circuit or non-volatile memory of the controller for use in driving the display panel. These voltages are referenced for tilt correction and color realization when the display panel is installed (typically right after the display panel has been manufactured). The uniformity and error tolerance problem is effectively shifted away from the display panel manufacturing to the electric driver circuit, which will typically be external to the modulators. The tolerance permitted in the manufacturing error can thus be relaxed to achieve significant cost savings.

Calibration and color correction processes are required to make a display panel from the FPI modulator array that reflects a consistent color gamut. FIG. 14 shows an exemplary schematic 1200 of a panel calibration setup. A reflective display panel 1201 is exposed to full spectrum white light. Row conductors 1202 and column conductors 1203 are connected to a variable voltage source 1204. A spectrometer 1207 is disposed opposite display panel 1201 to receive light 1205 reflected from each pixel in the display panel. The color gamut is sampled and analyzed to determine the required voltage that must be supplied to the four electrodes of each pixel to both compensate for tilting of the movable mirror relative to the fixed mirror in the modulator(s) for that pixel, and to achieve the desired color. The required voltages for each group of modulators for the pixels having common voltage relationship characteristics are grouped together, and the voltage relationships for each different group are archived for the color calibration and correction process and stored in memory for use when the display is placed into operation.

Steps for Calibration of a Display Panel:
1. Scan and acquire voltage/color relationship from each pixel. The calibration can be done by ramping up voltage to the electrodes on the base plate. The voltage to both parallel electrodes is kept identical in this step. Tabulate the voltage sets for each pixel corresponding to four primary colors.
2. Analyze the color spectrums for the four corners of each pixel, for each of the four primary colors. Any deviation is quantified and voltages applied to the electrodes are further adjusted to correct color gamut and compensate tilting, through iteration to achieve a consistent desired color for the pixels. Temporarily store the voltage sets applied to the electrodes corresponding to four primary colors, for each pixel.
3. Iterate through step 1 and 2 until a consistent color gamut from each pixels is achieved.
4. Tabulate voltage sets for each primary color and store the information in a non-volatile, e.g., a read only memory (ROM).

Steps for Color Correction of the Pixels of a Display Panel
1. Receive an input video or image signal.
2. Parse the video or image signal to map to the pixel index.
3. Acquire calibration color/voltage sets from the calibration table stored in non-volatile memory.
4. Modulate the input signal to control the voltages applied to the electrodes of each pixel modulator according to color/voltage sets stored in the table in non-volatile memory, and the video/image input signal.
5. Apply the modulated signal to the display panel to apply the appropriate voltages to the electrodes, so that the video/image is produced on it.

Exemplary System Correcting Color & Compensating Tilt

FIG. 15 illustrates an exemplary system 1300 in which the color and tilt errors of each group of FPI modulators having similar or nearly identical characteristics and tilt errors is corrected and/or compensated by the differential voltages applied to different electrodes used to actuate the movable mirror in each modulator. In response to a video or image input signal 1302, a controller 1304 determines the color that must be produced for the current display frame, for each pixel in the display. As noted above, controller 1304 can use either a spatial or temporal dithering technique for producing any desired color at of a full spectrum of visible colors at each pixel, during the current display frame. Controller 1304 may comprise either a hardwired logic device, a processor executing a predefined software program, an application specific integrated circuit, or any other device suitable for carrying out the control functions discussed below. A variable voltage generator 1306 is coupled to controller 1304 and controlled by it in accord with a table of voltage levels defined for each group of modulators that have generally similar characteristics in connection with the voltage required to be applied to the electrodes in the modulator to produce each of a plurality of primary visible colors, and the differential voltages that must be applied to compensate for any tilt of the movable mirror as it is actuated and moved to achieve the cavity depths in the modulator to produce those colors. As explained above, the differential voltages applied to electrodes disposed along a first axis can be selected to compensate for the tilt of the movable mirror relative to the fixed mirror about a second axis that is orthogonal to the first axis and in a plane (along with the first axis) that is parallel to the plane of the movable mirror. Accordingly, when the controller specifies a color for each pixel in a common group, the voltage generator (or alternatively, the controller) obtains the level of voltages from a color correction/tilt compensation lookup table 1308 to be applied to the electrodes of each modulator in the group for the pixels that are being activated in the current frame of a display in a video or in an image being presented on the display. The voltage generator then applies the appropriate voltages to row/column drivers of a display 1310, to achieve the desired color for each pixel in the current frame. As an alternative, it will be understood that the row and column drivers can instead be separate from the display, but it is generally more economical to provide a display with these drivers as integral parts thereof. Controller 1304 also provides the signals to the row and column drivers to activate each pixel in a row and column as appropriate to produce the current frame of the video or image being presented on the display.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. An interferometric modulator having a movable plate that is actuated to define a cavity and is automatically controlled to compensate for imbalance conditions that can otherwise cause the movable plate to tilt about at least one of two orthogonal axes, comprising:
   (a) a fixed plate that is disposed opposite the movable plate, where a distance between the movable plate and the fixed plate defines a depth of the cavity, where the cavity is used to modulate light transmitted into the cavity;
   (b) a plurality of electrodes that are disposed opposite at least one other electrode, wherein either the plurality of electrodes or the at least one other electrode is disposed on the movable plate;
   (c) conductors coupled to the plurality of electrodes and to the at least one other electrode, the conductors being configured to be coupled to a controlled voltage source, to enable predefined voltages to be applied to each of the electrodes of the plurality of electrodes, wherein application of an appropriate voltage to each electrode produces an electrostatic attraction that moves the movable plate so as to change the depth of the cavity and also compensates for the imbalance conditions to substantially eliminate tilting of the movable plate about at least one of the two orthogonal axes.

2. The interferometric modulator of claim 1, wherein the plurality of electrodes comprises three electrodes that are disposed asymmetrically about at least one of the two orthogonal axes.

3. The interferometric modulator of claim 1, wherein the plurality of electrodes comprises two electrodes that are disposed side-by-side each other along a first axis that is parallel to a plane of the fixed plate, further comprising two supplemental electrodes disposed side-by-side each other along a second axis that is parallel to the plane of the fixed plate, generally orthogonal to the first axis, and substantially parallel to one of the orthogonal axes, but on a different surface than the plurality of electrodes and the at least one other electrode.

4. The interferometric modulator of claim 1, further comprising a bottom plate that is configured so that the movable plate is disposed between the fixed plate and the bottom plate, the bottom plate also being fixed in position and including either:
   (a) the plurality of electrodes; or
   (b) the at least one electrode.

5. The interferometric modulator of claim 1, wherein the interferometric modulator is one of a plurality of similar interferometric modulators arranged in rows and columns of a display panel, further comprising conductors that convey the voltages to actuate each electrode in the display panel with voltages that produce a desired reflected color for the interferometric modulator at each pixel position in the display panel and also compensates for any tilting of the movable plate relative to the fixed plate.

6. The interferometric modulator of claim 1, wherein each of the fixed plate and the movable plate includes a partially reflective coating that transmits a part of light incident thereon and reflects a remainder of the light, to cause optical interference and thereby produce a reflected light of a desired color, from the modulator.

7. The interferometric modulator of claim 6, wherein the partially reflective coating comprises either an electrically conductive material or is a dielectric coated with an electrically conductive film.

8. The interferometric modulator of claim 1, further comprising an electrical insulator coating on at least one of the movable plate and the fixed plate to electrically insulate the movable plate from the fixed plate.

9. The interferometric modulator of claim 8, wherein the movable plate is fully in contact with the fixed plate when the movable plate is not actuated by the voltage applied to the plurality of electrodes.

10. The interferometric modulator of claim 1, further comprising at least one spring beam that supports the movable plate in suspension and provides an elastic restoring force compatible with a rigidity of the movable plate, so that the at least one spring beam provides sufficient elastic restoring force to restore the movable plate to an un-activated position when the voltage is removed from the plurality of electrodes, but not so great as to cause a distortion of the movable plate when the movable plate is actuated by the voltage applied to the plurality of electrodes.

11. The interferometric modulator of claim 10, wherein the at least one spring beam comprises a single spring beam that is coupled to the movable plate at a point spaced apart from an edge of the movable plate.

12. The interferometric modulator of claim 10, wherein the at least one spring beam comprises two spring beams disposed along opposite edges of the movable plate.

13. The interferometric modulator of claim 10, wherein the at least one spring beam comprises a spring beam disposed along each different edge of the movable plate.

14. A method for controlling a movable plate of an interferometric modulator to compensate for imbalance conditions that can otherwise cause the movable plate to tilt and not be substantially parallel to a top fixed plate, where a distance between the movable plate and the top fixed plate defines a depth of a modulation cavity in which light is modulated, comprising the steps of:
   (a) providing a first plurality of electrodes distributed over a surface in the interferometric modulator;
   (b) providing at least one other electrode, wherein each electrode of the first plurality of electrodes is disposed opposite the at least one other electrode; and
   (c) applying voltage to the first plurality of electrodes and the at least one other electrode, where the voltage applied to each of the plurality of electrodes is selected to produce an electrostatic attraction that compensates for the imbalance conditions and causes the movable plate to move relative to the top fixed plate so as to change a depth of the modulation cavity and a color of light reflected by the interferometric modulator, while preventing the movable plate from tilting out of a generally parallel relationship with the top fixed plate.

15. The method of claim 14, wherein the step of providing the first plurality of electrodes comprises the step of dividing an area of the movable plate to define each electrode of the first plurality of electrodes.

16. The method of claim 14, wherein the step of providing the first plurality of electrodes comprises the step of dividing an area of the top fixed plate to define each electrode of the first plurality of electrodes.

17. The method of claim 14, wherein the step of providing the first plurality of electrodes comprises the step of dividing an area of a bottom fixed plate that is disposed opposite a side of the movable plate opposite that where the top fixed plate is disposed, to define each electrode of the first plurality of electrodes.

18. The method of claim 14, further comprising the step of electrically insulating the movable plate from the top fixed plate.

19. The method of claim 14, further comprising the step of determining the voltage that must be applied to each electrode of the first plurality of electrodes to produce a desired reflected color with the interferometric modulator and to compensate for any tilting of the movable plate relative to the top fixed plate.

20. The method of claim 19, further comprising the step of storing an indication of the voltage that was determined in a non-volatile memory for use in automatically actuating the movable plate with an appropriate voltage when the interferometric modulator is being used in a display panel, to produce the desired reflected color and compensate for any tilting of the movable plate relative to the top fixed plate.

21. The method of claim 20, further comprising the steps of:
   (a) for a display panel that includes a plurality of the interferometric modulators, for each interferometric modulator in the display, determining the voltage that must be applied to each electrode of the first plurality of electrodes to produce a desired reflected color with the interferometric modulator and to compensate for any tilting of the movable plate relative to the top fixed plate;
   (b) storing an indication of the voltages for each of the electrodes of the interferometric modulators used in the display panel, in a non-volatile memory; and
   (c) when the display panel is being used, applying the voltages thus determined and indicated in the non-volatile memory for each electrode of the interferometric modulators, when the movable mirror of the interferometric modulator at a pixel position in the display panel is being actuated, to produce the desired color for the pixel position.

22. The method of claim 21, further comprising the steps of grouping the interferometric modulators in the display into groups, so that the interferometric modulators in each group have generally common voltages that must be applied to achieve a desired reflected color and to compensate for any tilting of the movable plate relative to the top fixed plate for each interferometric modulator in the group.

23. The method of claim 14, further comprising the step of providing a second plurality of electrodes distributed over a surface of the interferometric modulator that is different than the surface on which the first plurality of electrodes are distributed, the first plurality of electrodes defining one of row electrodes and column electrodes, and the second plurality of electrodes defining the other of the row electrodes and the column electrodes.

24. The method of claim 23, wherein the step of providing the second plurality of electrodes comprises the steps of dividing an area of the top fixed plate to define each electrode of the second plurality of electrodes.

25. The method of claim 23, wherein the step of providing the second plurality of electrodes comprises the steps of dividing an area of the movable plate to define each electrode of the second plurality of electrodes.

26. The method of claim 23, wherein the step of providing the second plurality of electrodes comprises the step of dividing an area of a bottom fixed plate that is disposed opposite a side of the movable plate opposite that where the top fixed plate is disposed, to define each electrode of the second plurality of electrodes.

27. An interferometric modulator for reflecting light of a desired waveband, comprising:
   (a) a partially reflective top plate on which light from an external source is incident, a portion of the light incident on the partially reflective top plate being transmitted through the partially reflective top plate and a remaining portion of the light incident on the partially reflective top plate being reflected by the partially reflective top plate;
   (b) a movable partially reflective plate that is suspended and supported by at least one spring beam, so that the movable partially reflective plate is able to move relative to the partially reflective top plate;
   (c) a first set of electrodes disposed on a surface within the interferometric modulator;
   (d) at least one other electrode disposed opposite the first set of electrodes; and
   (e) a controlled voltage source that is coupled to the first set of electrodes and to the at least one other electrode, the controlled voltage source applying voltages to each electrode of the first set of electrodes, the voltage applied being at levels selected to:
      (i) electrostatically actuate the movable partially reflective plate to move relative to the partially reflective top plate to define a cavity between the partially reflective top plate and the movable partially reflective plate, so that the cavity has a depth appropriate to modulate light transmitted into the cavity through the partially reflective top plate, whereby the light modulated by the cavity interferes with the light reflected from the partially reflective top plate and achieves the desired waveband of light reflected by the interferometric modulator; and (ii) compensate any tilt of the movable partially reflective plate relative to the partially reflective top plate so as to keep the movable partially reflective plate substantially parallel with the partially reflective top plate.

28. The interferometric modulator of claim 27, further comprising a bottom plate disposed below the movable partially reflective plate, wherein the surface on which the first set of electrodes is disposed is on one of:
(a) the partially reflective top plate;
(b) the movable partially reflective plate; and
(c) the bottom plate.

29. The interferometric modulator of claim 27, further comprising a bottom plate disposed below the movable partially reflective plate, wherein the at least one other electrode is disposed on one of:
(a) the partially reflective top plate;
(b) the movable partially reflective plate; and
(c) the bottom plate.

30. The interferometric modulator of claim 27, wherein the movable partially reflective plate is supported by a single spring beam that provides a restoring force sufficient to restore the movable partially reflective plate to a rest position when the voltage is not applied to the first set of electrodes, but not so great as to distort the movable partially reflective plate when the voltage is applied to actuate the movable partially reflective plate.

31. The interferometric modulator of claim 27, wherein the movable partially reflective plate is supported by a plurality of spring beams, each spring beam being disposed adjacent a different edge of the movable reflective plate.

32. The interferometric modulator of claim 27, wherein the partially reflective top plate and the movable partially reflective plate are each coated with a coating selected from the group consisting of:
(a) a dielectric coating; and
(b) a metallic conductive coating.

33. The interferometric modulator of claim 27, further comprising an electrical insulator coating disposed between the partially reflective top plate and the movable reflective plate.

34. The interferometric modulator of claim 27, further comprising an indication stored in a non-volatile memory, of the voltages that should be applied to the first set of electrodes to actuate the movable reflective plate to move so that the depth of the cavity is achieved to produce each of a plurality of colors and so as to compensate for any tilting of the movable partially reflective plate relative to the partially reflective top plate.

35. The interferometric modulator of claim 27, further comprising a second set of electrodes disposed on a different surface than the first set of electrodes, wherein the first set of electrodes comprises one of a set of row electrodes and a set of column electrodes, and wherein the second set of electrodes comprises the other of the set of row electrodes and the set of column electrodes.

36. The interferometric modulator of claim 35, further comprising a bottom plate disposed below the movable partially reflective plate, wherein the second set of electrodes is disposed on one of:
(a) the partially reflective top plate;
(b) the movable partially reflective plate; and
(c) the bottom plate.

37. A method for compensating for forces acting to tilt a movable partially reflective plate of an interferometric modulator, so that the movable partially reflective plate remains substantially parallel to an adjacent fixed partially reflective plate when a cavity is defined between the fixed partially reflective plate and the movable partially reflective plate to modulate light so that a desired color of light is reflected by the interferometric modulator, comprising the steps of:
(a) providing a first set of electrodes disposed on a surface within the interferometric modulator;
(b) providing at least one electrode on at least one other surface opposite the surface on which the first set of electrodes is disposed;
(c) applying voltage to the first set of electrodes, wherein the voltage applied to each electrode in the first set of electrodes is controlled to:
(i) actuate the movable partially reflective plate to move relative to the fixed partially reflective plate, so as to define a cavity between the fixed partially reflective plate and the movable partially reflective plate having a depth appropriate to modulate light that is transmitted into the cavity through the fixed partially reflective plate, the light modulated by the cavity interfering with light reflected from the fixed partially reflective plate to achieve a desired waveband of light reflected by the interferometric modulator; and
(ii) compensate any tilt of the movable partially reflective plate relative to the fixed partially reflective plate so as to keep the movable partially reflective plate substantially parallel with the fixed partially reflective plate.

38. The method of claim 37, wherein the step of providing the first set of electrodes comprises the step of providing the first set of electrodes on the surface that is on either the movable partially reflective plate or the fixed partially reflective plate.

39. The method of claim 37, further comprising the steps of:
(a) determining a voltage level that should be applied to the first set of electrodes to achieve a desired reflected color for the interferometric modulator and to compensate for any tilting of the movable partially reflective plate;
(b) storing an indication of the voltage level in a non-volatile memory; and
(c) accessing the indication of the voltage level stored in the non-volatile memory and using the voltage level to both produce the desired reflected color and compensate for any tilting of the movable partially reflective plate.

40. The method of claim 37, further comprising the steps of:
(a) creating a display panel that includes a plurality of the interferometric modulators arrayed in rows and columns; and
(b) applying appropriate voltages to electrodes of each of the interferometric modulators to produce each color desired at a position in a row and column of the display panel and to compensate for any tilting of the movable partially reflective plate in each modulator, relative to the fixed partially reflective plate in the interferometric modulator.

41. The method of claim 37, further comprising the step of providing a bottom plate disposed below the movable partially reflective plate, wherein the step of providing the first set of electrodes comprises the step of providing the first set of electrodes on either the movable partially reflective plate, or the fixed partially reflective plate, or the bottom plate.

42. The method of claim 41, further comprising the step of providing a second set of electrodes on either the movable partially reflective plate, or the fixed partially reflective plate, or the bottom plate, the first set of electrodes comprising one of a set of row electrodes and a set of column electrodes, and the second set of electrodes comprising the other of the set of row electrodes and the set of column electrodes.

* * * * *